US012604290B2

(12) United States Patent
Kim et al.

(10) Patent No.: US 12,604,290 B2
(45) Date of Patent: Apr. 14, 2026

(54) METHOD AND APPARATUS FOR MEASURING SYNCHRONIZATION SIGNAL IN WIRELESS COMMUNICATION SYSTEM

(71) Applicant: ELECTRONICS AND TELECOMMUNICATIONS RESEARCH INSTITUTE, Daejeon (KR)

(72) Inventors: Jung Bin Kim, Daejeon (KR); Gyeong Rae Im, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 341 days.

(21) Appl. No.: 18/523,513

(22) Filed: Nov. 29, 2023

(65) Prior Publication Data

US 2024/0205858 A1 Jun. 20, 2024

(30) Foreign Application Priority Data

Nov. 30, 2022 (KR) ........................ 10-2022-0164443

(51) Int. Cl.
*H04W 56/00* (2009.01)
*H04B 7/185* (2006.01)

(52) U.S. Cl.
CPC ..... *H04W 56/0055* (2013.01); *H04B 7/18519* (2013.01)

(58) Field of Classification Search
CPC . H04W 56/00; H04W 56/0055; H04W 24/10; H04W 84/06; H04W 16/28; H04B 17/328; H04B 7/18519
See application file for complete search history.

(56) References Cited

U.S. PATENT DOCUMENTS

| | | | |
|---|---|---|---|
| 11,470,489 B2 | 10/2022 | Islam et al. | |
| 2020/0229008 A1 | 7/2020 | Islam et al. | |
| 2020/0351054 A1 | 11/2020 | Jung et al. | |
| 2021/0258897 A1 | 8/2021 | Ma et al. | |
| 2022/0159492 A1 | 5/2022 | Wu et al. | |
| 2022/0393754 A1 | 12/2022 | Cao et al. | |
| 2023/0011025 A1 | 1/2023 | Moon et al. | |
| 2023/0021160 A1 | 1/2023 | Lee et al. | |
| 2024/0223323 A1* | 7/2024 | Huang ................. | H04L 5/0053 |
| 2025/0330928 A1* | 10/2025 | Cui ................... | H04W 56/0015 |

OTHER PUBLICATIONS

Moderator (OPPO), "Final Summary of 8.4.4 Other Aspects of NR-NTN", R1-2106336, 3GPP TSG RAN WG1 Meeting #105e, e-Meeting, May 10-27, 2021.

* cited by examiner

*Primary Examiner* — Wayne H Cai

(74) *Attorney, Agent, or Firm* — Rabin & Berdo, P.C.

(57) ABSTRACT

A method of a terminal, according to an exemplary embodiment of the present disclosure, may comprise: receiving, from a base station, radio resource control (RRC) signaling including measurement gap configuration information (MeasGapConfig) including gap setup information (gap-SAT) of synchronization signal blocks (SSBs); obtaining transmission position information of first SSBs and second SSBs transmitted in different positions based on gap configuration (GapConfig) of the gap setup information; receiving the first SSBs and the second SSBs through different beams from the base station based on the obtained transmission position information; and measuring reception powers of the received first SSBs and second SSBs.

20 Claims, 11 Drawing Sheets

DATA
NETWORK

130

FEEDER LINK

110

SERVICE
LINK

120

FOOTPRINT OF BEAM

320 memory

Figure 3:
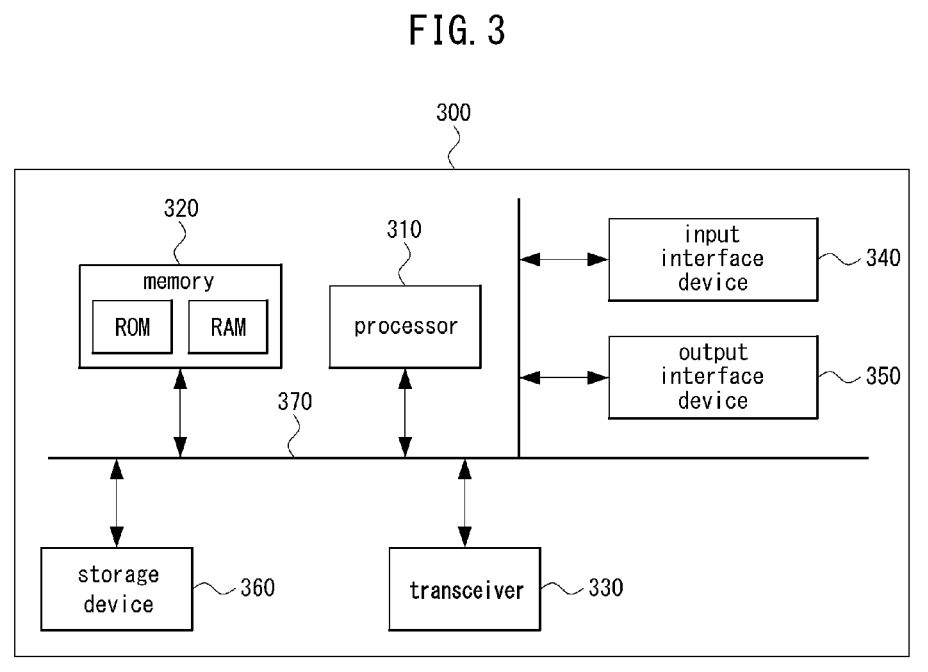

| ROM | RAM |

310 processor

370 input
interface
device ～340 output
interface
device ～350 storage
device ～360 transceiver ～330

METHOD AND APPARATUS FOR MEASURING SYNCHRONIZATION SIGNAL IN WIRELESS COMMUNICATION SYSTEM

CROSS-REFERENCE TO RELATED APPLICATIONS

This application claims priority to Korean Patent Application No. 10-2022-0164443, filed on Nov. 30, 2022, with the Korean Intellectual Property Office (KIPO), the entire contents of which are hereby incorporated by reference.

BACKGROUND

1. Technical Field

Exemplary embodiments of the present disclosure relate to a wireless communication technique, and more specifically, to a synchronization signal measurement technique in a wireless communication system.

2. Related Art

In a wireless cellular communication network, which includes mobile terminals or mobile base stations (e.g. satellites, unmanned aerial vehicles, etc.), wireless communication technologies facilitate various operations. These operations include handover support for accessing an adjacent cell, multi-connectivity for establishing connections to other networks, communication frequency band switching within intra-frequency or inter-frequency bands, and beam switching operations. These functionalities are designed to ensure uninterrupted and reliable communication services, as well as high-speed data transmission. To execute these operations, a terminal must measure the strengths of synchronization signals from adjacent cells, other networks, or different frequency bands. Consequently, various measurement operations have been defined to measure the strengths of synchronization signals from these sources. Moreover, the base station provides the terminal with configuration information for these measurement operations on synchronization signals. This enables the terminal to measure the strengths of synchronization signals from adjacent cells, other networks, or different frequency bands during the configured measurement operation time. During this measurement operation time, the terminal cannot receive data from the base station. As a result, the base station refrains from transmitting data to the terminal during this specific period.

If the base station limits the number of synchronization signal blocks (SSBs) transmitted within a period during which the terminal measures SSBs, the terminal may face difficulties in receiving SSBs within the configured measurement period. Therefore, there is a need for a measurement method that enables the terminal to smoothly receive SSBs during the designated measurement period.

Given that the terminal is unable to receive data in a frequency band transmitting SSBs during the SSB measurement period, conducting frequent or prolonged measurement operations may lead to a reduction in the terminal's data transmission rate. Hence, there is a necessity for a method to minimize the duration of the measurement operation.

When a terminal capable of accessing a non-terrestrial network (NTN) is connected to a terrestrial base station, the terrestrial base station can estimate the beam region of a satellite in which the terminal is located based on its own location information. Consequently, the terrestrial base station can configure measurement operations corresponding to the estimated satellite beam region. However, even in this scenario, SSB reception for the designated satellite beam may encounter difficulties due to estimation errors during the measurement of SSBs. Therefore, a measurement method to address this issue is necessary.

SUMMARY

Exemplary embodiments of the present disclosure are directed to providing a method and an apparatus for configuring a measurement gap to reduce the waste of operating time and resources when measuring synchronization signals of cells or beams for mobility support of a terminal or base station in a wireless communication network.

In addition, exemplary embodiments of the present disclosure are directed to providing a method for transmitting and receiving synchronization signals of cells or beams for mobility support of a terminal or base station.

According to a first exemplary embodiment of the present disclosure, a method of a terminal may comprise: receiving, from a base station, radio resource control (RRC) signaling including measurement gap configuration information (MeasGapConfig) including gap setup information (gap-SAT) of synchronization signal blocks (SSBs); obtaining transmission position information of first SSBs and second SSBs transmitted in different positions based on gap configuration (GapConfig) of the gap setup information; receiving the first SSBs and the second SSBs through different beams from the base station based on the obtained transmission position information; and measuring reception powers of the received first SSBs and second SSBs.

The transmission position information of the first SSBs and the second SSBs may be indicated as a bitmap, and each of bits constituting the bitmap may sequentially correspond to a unit of a half frame or a predetermined number of subframes within an SSB measurement gap repetition periodicity (MGRP).

The gap configuration may include at least one of a gap offset (gapOffset), a measurement gap length (MGL), a measurement gap repetition periodicity (MGRP), a measurement gap timing advance (MGTA), or a reference serving cell indicator (refServCellIndicator).

The first SSBs may be transmitted in a reference position, a position where the second SSBs are transmitted may be indicated by a first parameter included in the gap configuration as a number of intervals between the first SSBs and the second SSBs, and a unit of the interval may be a half frame or a predetermined number of subframes.

The gap configuration may include at least one of a gap offset (gapOffset), a measurement gap length (MGL), a measurement gap repetition periodicity (MGRP), a measurement gap timing advance (MGTA), or a reference serving cell indicator (refServCellIndicator); the MGTA may be interpreted as a number of intervals between a reference position where the first SSBs are transmitted and a position where the second SSBs are transmitted within the MGRP, when the gap configuration does not include information on a spacing between the first SSBs and the second SSBs; and a unit of the interval may be a half frame or a predetermined number of subframes.

The method may further comprise: upon successful measurement of the first SSBs or the second SSBs, transmitting measurement value(s) of successfully measured SSB(s) to the base station; and stopping measurement of the first SSBs or the second SSBs after transmitting the measurement value(s) of successfully measured SSB(s) to the base station.

Each of the measurement value(s) of successfully measured SSB(s) may be a channel state information (CSI) value measured in a layer 1 or a synchronization signal-reference signal reception power (SS-RSRP) value measured at a layer 3.

The method may further comprise: in response to a measurement failure of the first SSBs and the second SSBs, reporting, to the base station, a value preset to indicate a negative response among synchronization signal-reference signal received power (SS-RSRP) values.

The method may further comprise: receiving, from the base station, a physical downlink control channel (PDCCH) including an indication of request for a measurement response and information on an uplink resource for transmitting the measurement response for the first SSBs or the second SSBs; and transmitting, to the base station, a reception acknowledgment (ACK) for the first SSBs or the second SSBs or a reception negative ACK (NACK) for the first SSBs or the second SSBs through the uplink resource.

According to a second exemplary embodiment of the present disclosure, a terminal may comprise a processor, and the processor may cause the terminal to perform: receiving, from a base station, radio resource control (RRC) signaling including measurement gap configuration information (MeasGapConfig) including gap setup information (gapSAT) of synchronization signal blocks (SSBs); obtaining transmission position information of first SSBs and second SSBs transmitted from different positions based on gap configuration (GapConfig) of the gap setup information; receiving the first SSBs and the second SSBs through different beams from the base station based on the obtained transmission position information; and measuring reception powers of the received first SSBs and second SSBs.

The transmission position information of the first SSBs and the second SSBs may be indicated as a bitmap, and each of bits constituting the bitmap may sequentially correspond to a unit of a half frame or a predetermined number of subframes within an SSB measurement gap repetition periodicity (MGRP).

The first SSBs may be transmitted in a reference position, a position where the second SSBs are transmitted may be indicated by a first parameter included in the gap configuration as a number of intervals between the first SSBs and the second SSBs, and a unit of the interval may be a half frame or a predetermined number of subframes.

The gap configuration may include at least one of a gap offset (gapOffset), a measurement gap length (MGL), a measurement gap repetition periodicity (MGRP), a measurement gap timing advance (MGTA), or a reference serving cell indicator (refServCellIndicator); the MGTA may be interpreted as a number of intervals between a reference position where the first SSBs are transmitted and a position where the second SSBs are transmitted within the MGRP, when the gap configuration does not include information on a spacing between the first SSBs and the second SSBs; and a unit of the interval may be a half frame or a predetermined number of subframes.

The processor may further cause the terminal to perform: upon successful measurement of the first SSBs or the second SSBs, transmitting measurement value(s) of successfully measured SSB(s) to the base station; and stopping measurement of the first SSBs or the second SSBs after transmitting the measurement value(s) of successfully measured SSB(s) to the base station, wherein each of the measurement value(s) of successfully measured SSB(s) may be a channel state information (CSI) value measured in a layer 1 or a synchronization signal-reference signal reception power (SS-RSRP) value measured at a layer 3.

The processor may further cause the terminal to perform: in response to a measurement failure of the first SSBs and the second SSBs, reporting, to the base station, a value preset to indicate a negative response among synchronization signal-reference signal received power (SS-RSRP) values.

The processor may further cause the terminal to perform: receiving, from the base station, a physical downlink control channel (PDCCH) including an indication of request for a measurement response and information on an uplink resource for transmitting the measurement response for the first SSBs or the second SSBs; and transmitting, to the base station, a reception acknowledgment (ACK) for the first SSBs or the second SSBs or a reception negative ACK (NACK) for the first SSBs or the second SSBs through the uplink resource.

According to a third exemplary embodiment of the present disclosure, a method of a base station may comprise: transmitting, to a terminal, radio resource control (RRC) signaling including measurement gap configuration information (MeasGapConfig) including gap setup information (gapSAT) of synchronization signal blocks (SSBs); transmitting first SSBs and second SSBs through beams respectively corresponding to a plurality of spatially separated regions, based on the measurement gap configuration information; and receiving a reception power for at least one SSB among the first SSBs or the second SSBs from the terminal, wherein a gap configuration (GapConfig) included in the gap setup information includes transmission position information of the first SSBs and the second SSBs transmitted in different positions within an SSB measurement gap repetition periodicity (MGRP).

The transmission position information of the first SSBs and the second SSBs may be indicated as a bitmap, and each of bits constituting the bitmap may sequentially correspond to a unit of a half frame or a predetermined number of subframes within the SSB MGRP.

The first SSBs may be transmitted in a reference position, a position where the second SSBs are transmitted may be indicated by a first parameter included in the gap configuration as a number of intervals from the first SSBs, and a unit of the interval may be a half frame or a predetermined number of subframes.

The gap configuration may include at least one of a gap offset (gapOffset), a measurement gap length (MGL), a measurement gap repetition periodicity (MGRP), a measurement gap timing advance (MGTA), or a reference serving cell indicator (refServCellIndicator); the MGTA may be interpreted as a number of intervals between a reference position where the first SSBs are transmitted and a position where the second SSBs are transmitted within the MGRP, when the gap configuration does not include information on a spacing between the first SSBs and the second SSBs; and a unit of the interval may be a half frame or a predetermined number of subframes.

According to exemplary embodiments of the present disclosure, if all SSBs cannot be transmitted within one SSB measurement repetition period, the SSBs can be transmitted as being divided. In addition, by notifying the terminal in advance that the SSBs are to be transmitted as being divided, the terminal can measure the SSBs transmitted as being divided. Furthermore, by reporting SSB measurement results to the base station, the base station can identify whether the terminal is performing SSB measurement.

BRIEF DESCRIPTION OF DRAWINGS

FIG. 1 is a conceptual diagram illustrating a first exemplary embodiment of a non-terrestrial network.

FIG. 2 is a conceptual diagram illustrating a second exemplary embodiment of a non-terrestrial network.

FIG. 3 is a block diagram illustrating a first exemplary embodiment of an entity constituting a non-terrestrial network.

DETAILED DESCRIPTION OF THE EMBODIMENTS

Figure 4A:
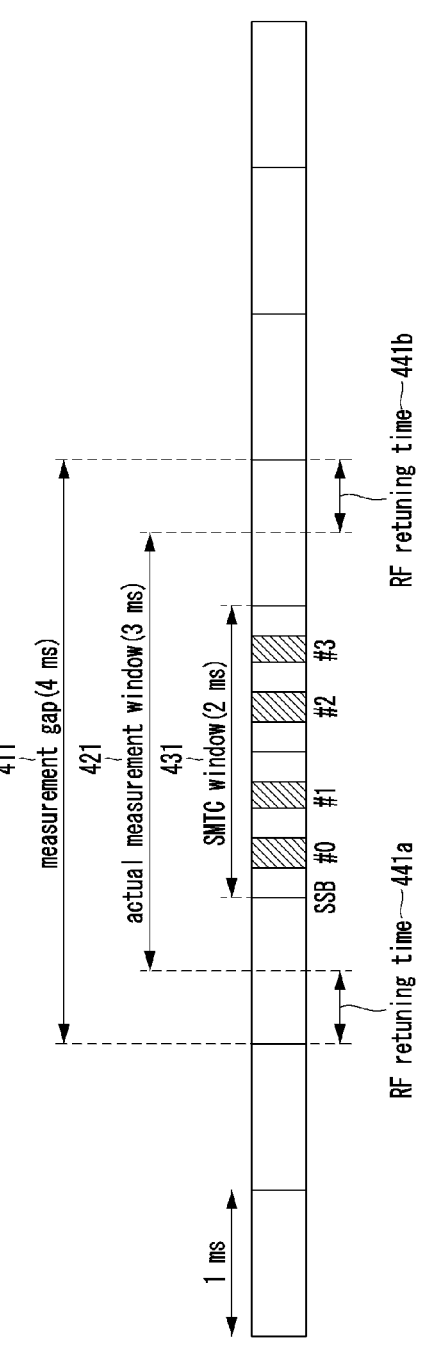
FIG. 4A is a conceptual diagram illustrating a case of having a subcarrier spacing (SCS) of 15 kHz, RF retuning time of 0.5 ms, and measurement gap length of 4 ms.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication network to which exemplary embodiments according to the present disclosure are applied will be described. The communication system may be a non-terrestrial network (NTN), a 4G communication network (e.g. long-term evolution (LTE) communication network), and/or a 5G communication network (e.g. new radio (NR) communication network). The 4G communication network and 5G communication network may be classified as terrestrial networks.

The NTN may operate based on the LTE technology and/or the NR technology. The NTN may support communications in frequency bands below 6 GHz as well as in frequency bands above 6 GHz. The 4G communication network may support communications in the frequency band below 6 GHz. The 5G communication network may support communications in the frequency band below 6 GHz as well as in the frequency band above 6 GHz. The communication network to which the exemplary embodiments according to the present disclosure are applied is not limited to the contents described below, and the exemplary embodiments according to the present disclosure may be applied to various communication networks. Here, the communication network may be used in the same sense as the communication system.

Figure 1:
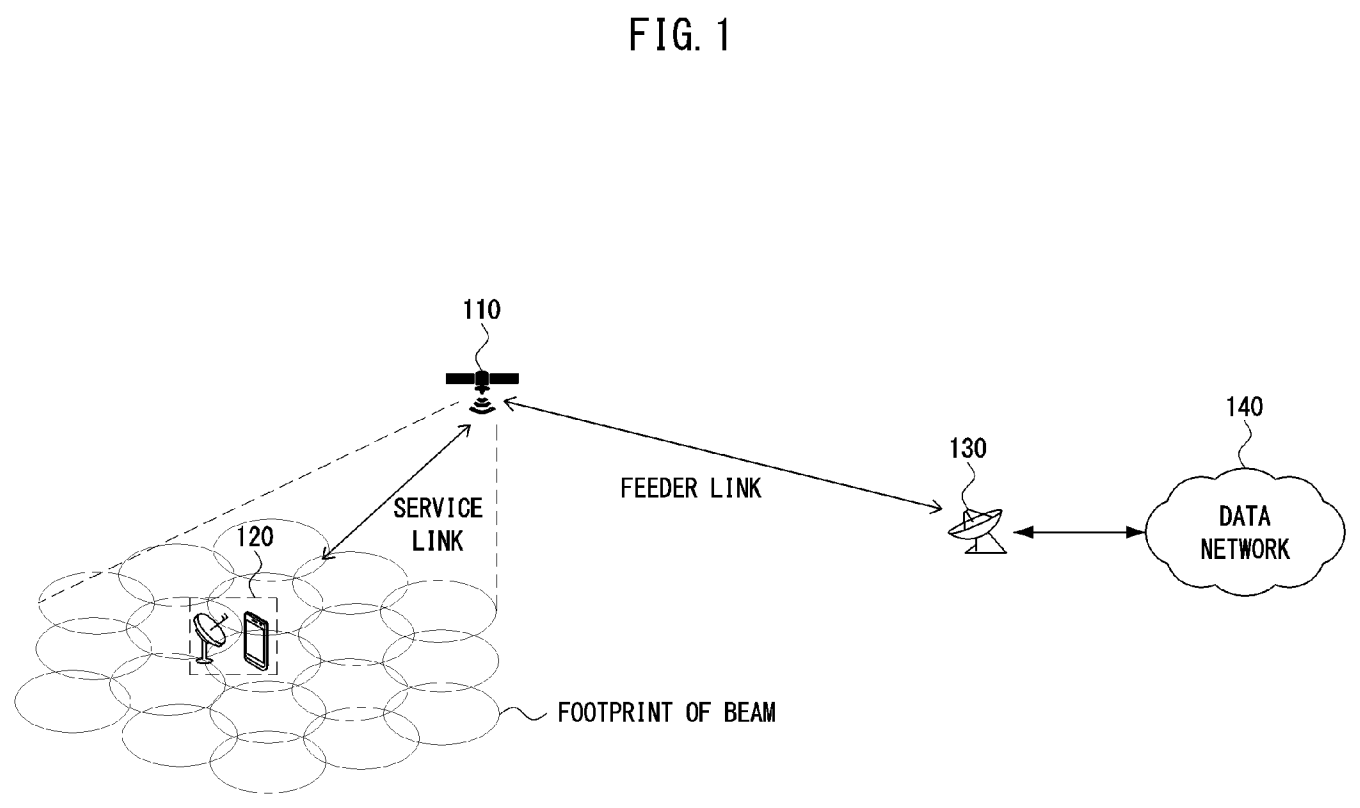

FIG. 1 is a conceptual diagram illustrating a first exemplary embodiment of a non-terrestrial network.

Referring to FIG. 1, a non-terrestrial network (NTN) may include a satellite 110, a communication node 120, a gateway 130, a data network 140, and the like. The NTN shown in FIG. 1 may be an NTN based on a transparent payload. The satellite 110 may be a low earth orbit (LEO) satellite, a medium earth orbit (MEO) satellite, a geostationary earth orbit (GEO) satellite, a high elliptical orbit (HEO) satellite, or an unmanned aircraft system (UAS) platform. The UAS platform may include a high altitude platform station (HAPS).

The communication node 120 may include a communication node (e.g. a user equipment (UE) or a terminal) located on a terrestrial site and a communication node (e.g. an airplane, a drone) located on a non-terrestrial space. A service link may be established between the satellite 110 and the communication node 120, and the service link may be a radio link. The satellite 110 may provide communication services to the communication node 120 using one or more beams. The shape of a footprint of the beam of the satellite 110 may be elliptical.

The communication node 120 may perform communications (e.g. downlink communication and uplink communication) with the satellite 110 using LTE technology and/or NR technology. The communications between the satellite 110 and the communication node 120 may be performed using an NR-Uu interface. When dual connectivity (DC) is supported, the communication node 120 may be connected to other base stations (e.g. base stations supporting LTE and/or NR functionality) as well as the satellite 110, and perform DC operations based on the techniques defined in the LTE and/or NR specifications.

The gateway 130 may be located on a terrestrial site, and a feeder link may be established between the satellite 110 and the gateway 130. The feeder link may be a radio link. The gateway 130 may be referred to as a 'non-terrestrial network (NTN) gateway'. The communications between the satellite 110 and the gateway 130 may be performed based on an NR-Uu interface or a satellite radio interface (SRI). The gateway 130 may be connected to the data network 140. There may be a 'core network' between the gateway 130 and the data network 140. In this case, the gateway 130 may be connected to the core network, and the core network may be connected to the data network 140. The core network may support the NR technology. For example, the core network may include an access and mobility management function (AMF), a user plane function (UPF), a session management function (SMF), and the like. The communications between the gateway 130 and the core network may be performed based on an NG-C/U interface.

Alternatively, a base station and the core network may exist between the gateway 130 and the data network 140. In this case, the gateway 130 may be connected with the base station, the base station may be connected with the core network, and the core network may be connected with the data network 140. The base station and core network may support the NR technology. The communications between the gateway 130 and the base station may be performed based on an NR-Uu interface, and the communications between the base station and the core network (e.g. AMF, UPF, SMF, and the like) may be performed based on an NG-C/U interface.

Figure 2:
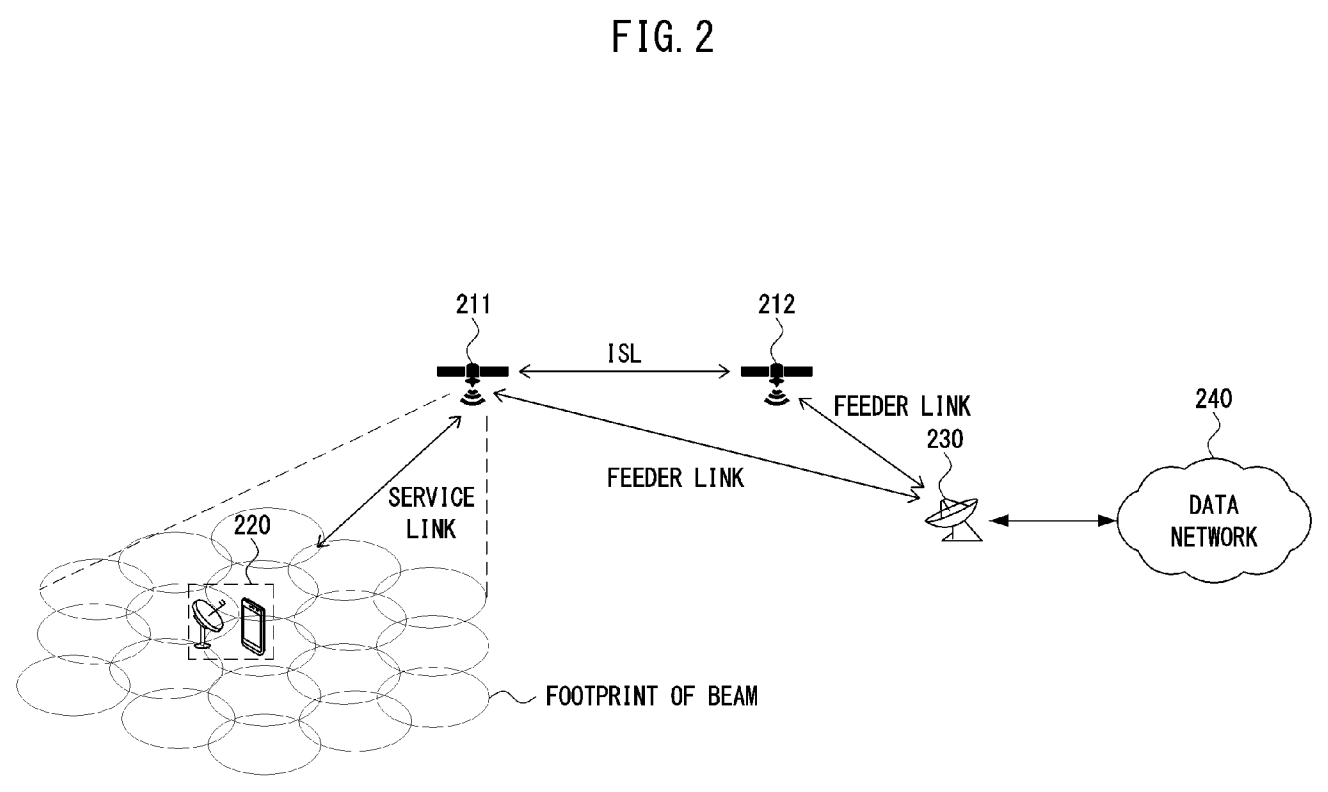

FIG. 2 is a conceptual diagram illustrating a second exemplary embodiment of a non-terrestrial network.

Referring to FIG. 2, a non-terrestrial network may include a first satellite 211, a second satellite 212, a communication node 220, a gateway 230, a data network 240, and the like. The NTN shown in FIG. 2 may be a regenerative payload based NTN. For example, each of the satellites 211 and 212 may perform a regenerative operation (e.g. demodulation, decoding, re-encoding, re-modulation, and/or filtering operation) on a payload received from other entities (e.g. the communication node 220 or the gateway 230), and transmit the regenerated payload.

Each of the satellites 211 and 212 may be a LEO satellite, a MEO satellite, a GEO satellite, a HEO satellite, or a UAS platform. The UAS platform may include a HAPS. The satellite 211 may be connected to the satellite 212, and an inter-satellite link (ISL) may be established between the satellite 211 and the satellite 212. The ISL may operate in an RF frequency band or an optical band. The ISL may be established optionally. The communication node 220 may include a terrestrial communication node (e.g. UE or terminal) and a non-terrestrial communication node (e.g. airplane or drone). A service link (e.g. radio link) may be established between the satellite 211 and communication node 220. The satellite 211 may provide communication services to the communication node 220 using one or more beams.

The communication node 220 may perform communications (e.g. downlink communication or uplink communication) with the satellite 211 using LTE technology and/or NR technology. The communications between the satellite 211 and the communication node 220 may be performed using an NR-Uu interface. When DC is supported, the communication node 220 may be connected to other base stations (e.g. base stations supporting LTE and/or NR functionality) as well as the satellite 211, and may perform DC operations based on the techniques defined in the LTE and/or NR specifications.

The gateway 230 may be located on a terrestrial site, a feeder link may be established between the satellite 211 and the gateway 230, and a feeder link may be established between the satellite 212 and the gateway 230. The feeder link may be a radio link. When the ISL is not established between the satellite 211 and the satellite 212, the feeder link between the satellite 211 and the gateway 230 may be established mandatorily.

The communications between each of the satellites 211 and 212 and the gateway 230 may be performed based on an NR-Uu interface or an SRI. The gateway 230 may be connected to the data network 240. There may be a core network between the gateway 230 and the data network 240. In this case, the gateway 230 may be connected to the core network, and the core network may be connected to the data network 240. The core network may support the NR technology. For example, the core network may include AMF, UPF, SMF, and the like. The communications between the gateway 230 and the core network may be performed based on an NG-C/U interface.

Alternatively, a base station and the core network may exist between the gateway 230 and the data network 240. In this case, the gateway 230 may be connected with the base station, the base station may be connected with the core network, and the core network may be connected with the data network 240. The base station and the core network may support the NR technology. The communications between the gateway 230 and the base station may be performed based on an NR-Uu interface, and the communications between the base station and the core network (e.g. AMF, UPF, SMF, and the like) may be performed based on an NG-C/U interface.

Meanwhile, entities (e.g. satellites, communication nodes, gateways, etc.) constituting the NTNs shown in FIGS. 1 and 2 may be configured as follows.

FIG. 3 is a block diagram illustrating a first exemplary embodiment of an entity constituting a non-terrestrial network.

Referring to FIG. 3, an entity 300 may include at least one processor 310, a memory 320, and a transceiver 330 connected to a network to perform communication. In addition, the entity 300 may further include an input interface device 340, an output interface device 350, a storage device 360, and the like. The components included in the entity 300 may be connected by a bus 370 to communicate with each other.

However, each component included in the entity 300 may be connected to the processor 310 through a separate interface or a separate bus instead of the common bus 370. For example, the processor 310 may be connected to at least one of the memory 320, the transceiver 330, the input interface device 340, the output interface device 350, and the storage device 360 through a dedicated interface.

The processor 310 may execute at least one instruction stored in at least one of the memory 320 and the storage device 360. The processor 310 may refer to a central processing unit (CPU), a graphics processing unit (GPU), or a dedicated processor on which the methods according to the exemplary embodiments of the present disclosure are performed. Each of the memory 320 and the storage device 360 may be configured as at least one of a volatile storage medium and a nonvolatile storage medium. For example, the memory 320 may be configured with at least one of a read only memory (ROM) and a random access memory (RAM).

Meanwhile, scenarios in the NTN may be defined as shown in Table 1 below.

TABLE 1

|  | NTN shown in FIG. 1 | NTN shown in FIG. 2 |
| --- | --- | --- |
| GEO | Scenario A | Scenario B |
| LEO (steerable beams) | Scenario C1 | Scenario D1 |
| LEO (beams moving with satellite) | Scenario C2 | Scenario D2 |

When the satellite 110 in the NTN shown in FIG. 1 is a GEO satellite (e.g. a GEO satellite that supports a transparent function), this may be referred to as 'scenario A'. When the satellites 211 and 212 in the NTN shown in FIG. 2 are GEO satellites (e.g. GEOs that support a regenerative function), this may be referred to as 'scenario B'.

When the satellite 110 in the NTN shown in FIG. 1 is an LEO satellite with steerable beams, this may be referred to as 'scenario C1'. When the satellite 110 in the NTN shown in FIG. 1 is an LEO satellite having beams moving with the satellite, this may be referred to as 'scenario C2'. When the satellites 211 and 212 in the NTN shown in FIG. 2 are LEO satellites with steerable beams, this may be referred to as 'scenario D1'. When the satellites 211 and 212 in the NTN shown in FIG. 2 are LEO satellites having beams moving with the satellites, this may be referred to as 'scenario D2'.

Parameters for the scenarios defined in Table 1 may be defined as shown in Table 2 below.

TABLE 2

|  | Scenarios A and B | Scenarios C and D |
| --- | --- | --- |
| Altitude | 35,786 km | 600 km<br>1,200 km |
| Spectrum (service link) | <6 GHz (e.g. 2 GHz)<br>>6 GHz (e.g. DL 20 GHz, UL 30 GHz) | |
| Maximum channel bandwidth capability (service link) | 30 MHz for band <6 GHz<br>1 GHz for band >6 GHz | |
| Maximum distance between satellite and communication node (e.g. UE) at the minimum elevation angle | 40,581 km | 1,932 km (altitude of 600 km)<br>3,131 km (altitude of 1,200 km) |
| Maximum round trip delay (RTD) (only propagation delay) | Scenario A: 541.46 ms (service and feeder links)<br>Scenario B: 270.73 ms (only service link) | Scenario C: (transparent payload: service and feeder links)<br>−5.77 ms (altitude of 60 0 km)<br>−41.77 ms (altitude of 1,200 km)<br>Scenario D: (regenerative payload: only service link)<br>−12.89 ms (altitude of 600 km)<br>−20.89 ms (altitude of 1,200 km) |
| Maximum delay variation within a single beam | 16 ms | 4.44 ms (altitude of 600 km)<br>6.44 ms (altitude of 1,200 km) |
| Maximum differential delay within a cell | 10.3 ms | 3.12 ms (altitude of 600 km)<br>3.18 ms (altitude of 1,200 km) |
| Service link | NR defined in 3GPP | |
| Feeder link | Radio interfaces defined in 3GPP or non-3GPP | |

In addition, in the scenarios defined in Table 1, delay constraints may be defined as shown in Table 3 below.

TABLE 3

|  | Scenario A | Scenario B | Scenario C1-2 | Scenario D1-2 |
| --- | --- | --- | --- | --- |
| Satellite altitude | 35,786 km | | 600 km | |
| Maximum RTD in a radio interface between base station and UE | 541.75 ms (worst case) | 270.57 ms | 28.41 ms | 12.88 ms |
| Minimum RTD in a radio interface between base station and UE | 477.14 ms | 238.57 ms | 8 ms | 4 ms |

Hereinafter, communication methods in a communication system will be described. Even when a method (e.g. transmission or reception of a signal) performed at a first communication node among communication nodes is described, the corresponding second communication node may perform a method (e.g. reception or transmission of the signal) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Meanwhile, in a communication system, a base station may perform all functions (e.g. remote radio transmission/reception function, baseband processing function, and the like) of a communication protocol. Alternatively, the remote radio transmission/reception function among all the functions of the communication protocol may be performed by a transmission and reception point (TRP) (e.g. flexible (f)-TRP), and the baseband processing function among all the functions of the communication protocol may be performed by a baseband unit (BBU) block. The TRP may be a remote radio head (RRH), radio unit (RU), transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of backhaul links and fronthaul links may be as follows. When a functional split scheme of the communication protocol is applied, the TRP may selectively perform some functions of the BBU or some functions of medium access control (MAC)/radio link control (RLC) layers.

As described above, in a wireless cellular communication network including mobile terminals or mobile base stations (e.g. satellites, UAV, etc.), a terminal needs to measure strengths of synchronization signals from adjacent cells, other networks, or other frequency bands. Therefore, various measurement operations capable of measuring the strengths of synchronization signals from adjacent cells, other networks, or other frequency bands have been defined. For example, in the 5G NR, there are three different measurement gap configurations (i.e. MeasGapConfig) as follows.

(1) gapFR1: A measurement gap configuration applicable only to a frequency range 1 (FR1), which includes a sub-6 GHz frequency band.

(2) gapFR2: A measurement gap configuration applicable only to a frequency range 2 (FR2), which includes a 24-100 GHz frequency band.

(3) gapUE: A measurement gap configuration applicable to all frequency bands.

GapConfig of MeasGapConfig which is configured by radio resource control (RRC) signaling may comprise the following parameters, and supportable measurement operations for synchronization signals may be defined with these parameters.

Measurement gap length (MGL): A time period for a measurement operation, supporting 1.5 ms, 3 ms, 3.5 ms, 4 ms, 5.5 ms, and 6 ms.

Measurement gap repetition periodicity (MGRP): An execution periodicity of the measurement operation, supporting 20 ms, 40 ms, 80 ms, and 160 ms.

RF retuning time: A radio frequency (RF) retuning time period of the terminal for measurement, which is 0.5 ms for FR1 and 0.25 ms for FR2.

Gap Offset (gapOffset): An offset for a measurement timing, and refers to a measurement start subframe within a measurement execution period. A range of the offset may be from 0 to MGRP-1.

The base station may deliver various configuration values for measurement operations, which are defined as exemplified above, to the terminal through RRC signaling. The terminal may measure received signal strengths by receiving synchronization signal/physical broadcast channel blocks (i.e. SSBs) from adjacent cells, other networks, or other frequency bands in a measurement operation period configured by the received RRC signaling. Here, a reception time period of SSBs to be measured by the terminal within the measurement operation period may be configured by an SSB measurement timing configuration (SMTC).

Figure 4B:
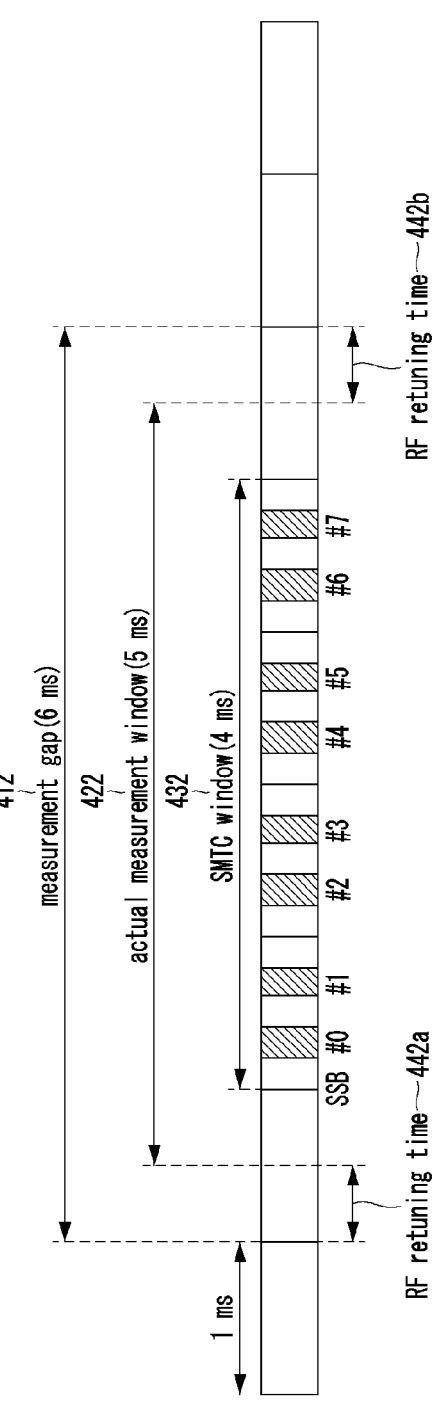
FIG. 4B is a conceptual diagram illustrating a case of having an SCS of 15 kHz, RF retuning time of 0.5 ms, and measurement gap length of 6 ms.

FIG. 4A is a conceptual diagram illustrating a case of having a subcarrier spacing (SCS) of 15 kHz, RF retuning time of 0.5 ms, and measurement gap length of 4 ms, and FIG. 4B is a conceptual diagram illustrating a case of having an SCS of 15 kHz, RF retuning time of 0.5 ms, and measurement gap length of 6 ms.

Referring to FIG. 4A, one subframe has a length of 1 ms. Since a measurement gap length (MGL) 411 is 4 ms, a measurement gap may be located over 4 subframes. FIG. 4A illustrates an example in which the MGL 411 is configured from a start point of the third slot to the sixth slot. Accordingly, an actual measurement window 421 may starts 0.5 ms after the MGL 411 starts, which is half of one slot, and may last for 3 ms. Further, an SSB measurement time configuration (SMTC) window 431 may start from the fourth slot and last for 2 ms. In this case, 0.5 ms from the start point of the MGL 411 to the start point of the actual measurement window 421 and 0.5 ms from the end point of the actual measurement window 421 to the end point of the MGL 411 may be RF retuning time periods 441a and 441b, respectively. There is no data transmission/reception segment in the RF retuning time periods 441a and 441b.

In FIG. 4A, SSBs (i.e. SSB #0, SSB #1, SSB #2, and SSB #3) may be transmitted within the SMTC window 431. Here, the SSBs may be transmitted through different beams.

FIG. 4B also illustrates a case where one subframe has a length of 1 ms. In FIG. 4B, since an MGL 412 is 6 ms, a measurement gap may be located over 6 subframes. FIG. 4B illustrates an example in which the MGL 412 is configured from a start point of the second slot to the seventh slot. Accordingly, an actual measurement window 422 may start 0.5 ms after the MGL 412 starts, which is half of one slot, and may last for 5 ms. Further, an SGTC window 432 may start from the third slot and last for 4 ms. In this case, 0.5 ms from the start point of the MGL 412 to the start point of the actual measurement window 422 and 0.5 ms from the end point of the actual measurement window 422 to the end point of the MGL 412 may be RF retuning time periods 442a and 442b, respectively. There is no data transmission/reception segment also in the RF retuning time periods 442a and 442b of FIG. 4B.

Also in FIG. 4B, SSBs (i.e. SSB #0, SSB #1, SSB #2, SSB #3, SSB #4, SSB #5, SSB #6, and SSB #7) may be transmitted within the SMTC window 432. Here, the SSBs may be transmitted through different beams.

Figure 5:
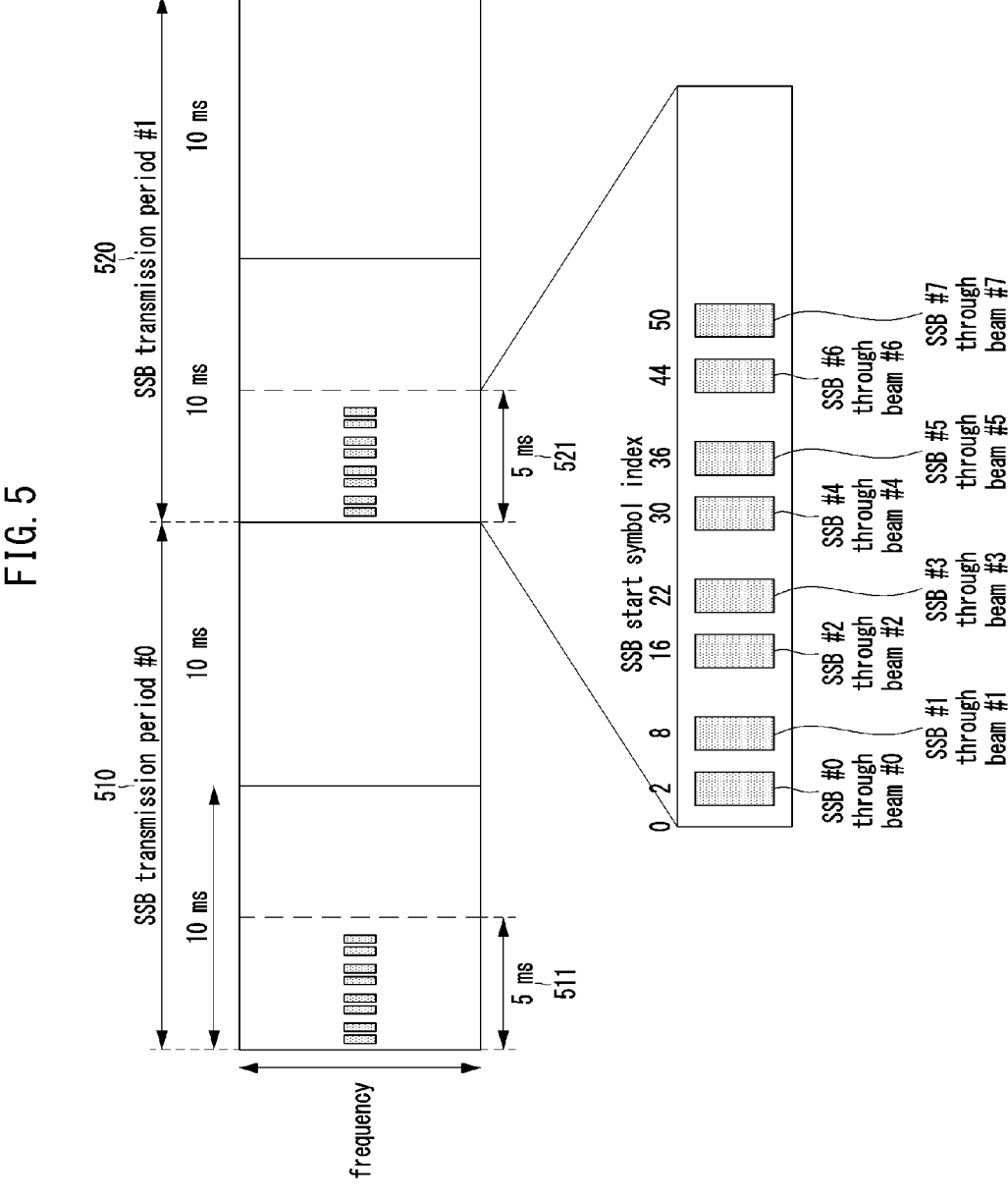
FIG. 5 is a conceptual diagram illustrating transmission timings when SSBs are transmitted using multiple beams in the 5G NR.

FIG. 5 is a conceptual diagram illustrating transmission timings when SSBs are transmitted using multiple beams in the 5G NR.

As previously described in FIGS. 4A and 4B, when SSB(s) are transmitted in specific slot(s), the terminal may perform a measurement operation. In this case, the base station may periodically transmit SSB(s) for the measurement operation of the terminal.

Referring to FIG. 5, it may be a conceptual diagram illustrating transmission timings of SSBs when a carrier frequency is in a sub-6 GHz band and an SCS is 15 kHz. In FIG. 5, SSBs may be transmitted at a periodicity of 20 ms. FIG. 5 illustrates an SSB transmission period #0 510 and SSB transmission period #1 520. In case of the 5GNR, unlike the existing LTE, within 20 ms SSB transmission periods 510 and 520, SSBs may be transmitted concentrated in the first 5 ms durations 511 and 521 where the respective periods start. In the example of FIG. 5, a total of 8 SSBs are transmitted within one period.

The example in FIG. 5 illustrates a case where 8 SSBs transmitted in the first 5 ms duration 521 in the SSB transmission period #1 521 are respectively transmitted through different beams. FIG. 5 illustrates start symbol indexes and beam indexes of 8 SSBs transmitted in the first 5 ms duration 521 of the SSB transmission period #1 521.

For example, an SSB #0 transmitted at an SSB start symbol index 2 may be transmitted through a beam #0, an SSB #1 transmitted at an SSB start symbol index 8 may be transmitted through a beam #1, an SSB #2 transmitted at an SSB start symbol index 16 may be transmitted through a beam #2, an SSB #3 transmitted at an SSB start symbol index 22 may be transmitted through a beam #3, an SSB #4 transmitted at an SSB start symbol index 30 may be transmitted through a beam #4, an SSB #5 transmitted at an SSB start symbol index 36 may be transmitted through a beam #5, an SSB #6 transmitted at an SSB start symbol index 44 may be transmitted through a beam #6, and an SSB #7 transmitted at an SSB start symbol index 50 may be transmitted through a beam #7.

As illustrated in FIG. 5, when the respective SSBs are transmitted through different beams, the terminal may only receive an SSB through a specific beam, or signal strengths of received SSBs may be different even if all SSBs are received through a specific beam. Therefore, the terminal may receive SSBs transmitted through different beams and measure signal strengths of the received SSBs. In addition, the terminal may select an SSB with the greatest received signal strength among the received SSBs based on the signal strength measurement of the SSBs. Then, the terminal may obtain information on a base station from the selected SSB.

Additionally, the terminal may report information on the signal strength(s) of the received SSB(s) to the base station. A terminal that supports 5G NR may report measurement value(s) of the SSB(s) to the base station using a measurement report in the RRC layer, which is a third layer (i.e. layer 3). Further, the terminal that supports 5G NR may report measurement value(s) of the SSB(s) to the base station using channel state information (CSI) reporting in a layer 1, which is a physical layer.

As an example, a reporting range of synchronization signal-reference signal received power (SS-RSRP) in the layer 3 may be from −156 dBm to −31 dBm. In addition, a reporting range of SS-RSRP in the layer 1 may be from −140 dBm to −40 dBm. Here, the sizes (payload sizes) of the report information of the layer 1 and the layer 3 may be the same (i.e. 7 bits).

Meanwhile, in case of satellite communication using multiple beams, each beam may be allocated to a spatially different region. This will be described with reference to attached FIG. 6.

Figure 6:
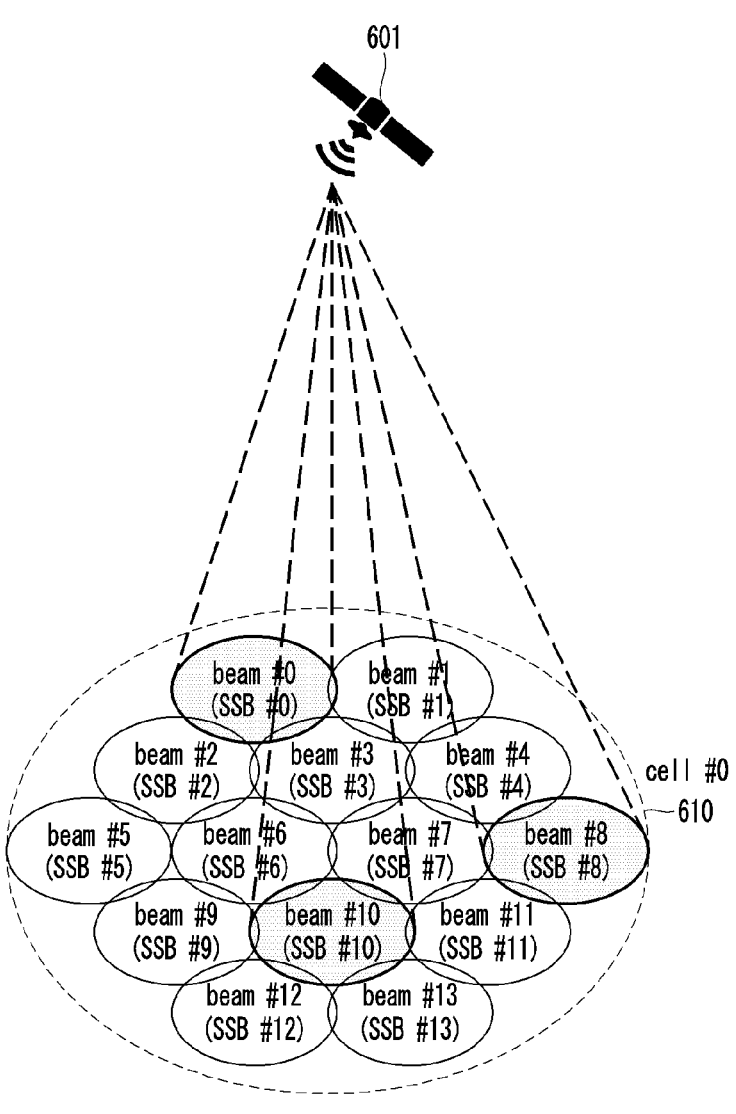
FIG. 6 is a conceptual diagram illustrating a structure of beams in a satellite communication system using multiple beams.

FIG. 6 is a conceptual diagram illustrating a structure of beams in a satellite communication system using multiple beams.

Referring to FIG. 6, a moving satellite 601 may configure one cell #0 610 using a plurality of beams. In FIG. 6, the cell #0 610 may be configured with a plurality of beams (i.e. beams #0 to beams #13). Each of the 14 narrow beams (i.e. beam #0 to beam #13) may cover a different spatially separated region. In addition, different SSBs (i.e. SSB #0 to SSB #13) may be respectively transmitted as being mapped to the 14 beams (i.e. beam #0 to beam #13), so that each of the beams can be identified. In other words, each beam may transmit SSB(s) mapped thereto.

Accordingly, the terminal may only receive SSB(s) for a beam corresponding to a region where the terminal is located. For example, if the terminal is located in a region covered by the beam #0, the terminal may only receive the SSB #0 mapped to the beam #0. As another example, if the terminal is located in a region covered by the beam #8, the terminal may only receive the SSB #8 mapped to the beam #8, and if the terminal is located in a region covered by the beam #10, the terminal may only receive the SSB #10 mapped to the beam #10.

Additionally, when communication is supported based on spatially separated beam regions as illustrated in FIG. 6, the terminal may perform a beam switching function through measurement of SSBs.

In a wireless communication network that supports multi-connectivity, including satellites, a terminal may access a base station capable of providing excellent communication quality. For example, if a terrestrial base station of the wireless communication system provides excellent communication quality, the terminal may access the terrestrial base station. On the other hand, if a satellite of the wireless communication system provides excellent communication quality, the terminal may access the satellite.

In this case, when the terminal is connected to the terrestrial base station, the terminal may receive SSB(s) transmitted from the satellite and measure received signal strength(s) of the received SSB(s) through a configured measurement operation. Conversely, when the terminal is connected to the satellite, the terminal may receive SSB(s) transmitted from the terrestrial base station and measure received signal strength(s) of the received SSB(s) through a configured measurement operation.

The number of SSBs transmitted from the base station or satellite, that is, the number of SSBs transmitted from the base station or satellite within a duration that the terminal can measure at once may be limited to a predetermined number. For example, as illustrated in FIG. 6, although the satellite 601 needs to transmit 14 SSBs, a case when only 4 SSBs can be transmitted within one SSB transmission period, or a case when only 8 SSBs can be transmitted within one SSB transmission period may occur as illustrated in FIGS. 4A and 4B.

If SSB transmission is limited to a predetermined number within the SSB transmission period as described above, the terminal may not be able to receive SSBs in the configured measurement duration. Therefore, an SSB measurement method that supports the terminal to smoothly receive SSBs in the measurement duration is needed.

In addition, as previously described in FIGS. 4A and 4B, the terminal cannot receive data in a frequency band where SSBs are transmitted within the measurement duration. Therefore, if SSBs are not transmitted in a specific SSB duration as in the example above, the terminal may need to perform frequent measurement operations or perform a measurement operation for a long time. This may ultimately result in a decrease in the data transmission rate of the terminal. Therefore, a method to reduce the length of the measurement operation is needed.

In addition, when a terminal capable of accessing a satellite is connected to a terrestrial base station, the terrestrial base station can estimate a beam region of the satellite in which the terminal is located based on its own location information. Consequently, the terrestrial base station can configure measurement operations corresponding to the estimated satellite beam region. However, even in this scenario, SSB reception for the satellite beam may encounter difficulties due to estimation errors during the measurement of SSBs. Therefore, a measurement method to address this issue is necessary.

In the present disclosure described below, SSB transmission/reception methods and SSB transmission/reception apparatus that can reliably receive SSBs while reducing a measurement time of the SSBs will be described.

The present disclosure may be applied to the following situations.

First, exemplary embodiments of the present disclosure may be applied when beam switching is supported in a wireless communication system where multiple beam regions are spatially separated.

Second, exemplary embodiments of the present disclosure may be applied when a satellite-enabled wireless communication system supports multi-connectivity using a terrestrial network and a satellite network.

The present disclosure will describe methods for reducing the waste of time and resources of the SSB measurement operations in the terminal when one of the two cases above applies. In addition, the present disclosure will describe measurement configuration methods and transmission/reception methods to support them, so that the terminal can smoothly measure SSB signals.

First Exemplary Embodiment: Measurement
Operation Configurations and Measurement
Methods According to Various SSB Transmissions FIG. 7 is a conceptual diagram illustrating a case when SSBs corresponding to 8 beams are transmitted within 2 radio frames in case of 15 kHz SCS.

Before referring to FIG. 7, a configuration of a radio frame in case of 15 kHz SCS will be described. In the 5G NR, if the SCS is 15 kHz, one radio frame may have a length of 10 ms. Accordingly, one radio frame may be composed of 10 slots each having a length of 1 ms. In this case, one slot with a length of 1 ms may be one subframe. One slot with a length of 1 ms may consist of 14 OFDM symbols. Based on the above configuration, the configuration of FIG. 7 will be described.

Figure 7:
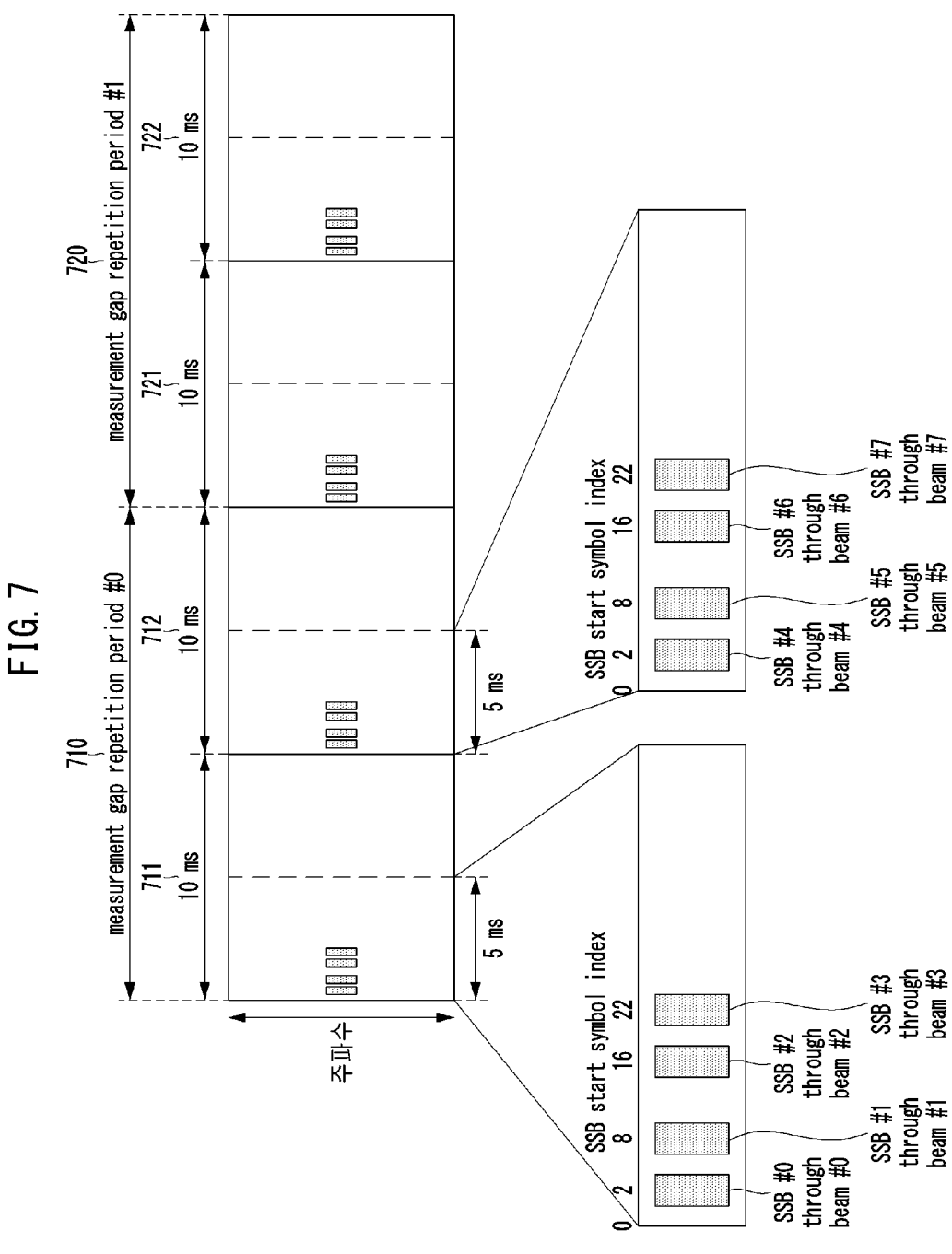
FIG. 7 is a conceptual diagram illustrating a case when SSBs corresponding to 8 beams are transmitted within 2 radio frames in case of 15 kHz SCS.

Referring to FIG. 7, a measurement gap repetition period #0 710 may consist of two radio frames 711 and 712, and a measurement gap repetition period #1 720 may also consist of two radio frames 721 and 722. Therefore, it can be seen that the measurement gap repetition period #0 710 and measurement gap repetition period #1 720 are each configured to have a length of 20 ms.

Meanwhile, in FIG. 5, it has been described that in the 5G NR system, SSBs are transmitted only in the first 5 ms of the radio frame with a length of 10 ms. FIG. 7 corresponds to the case of the 5G NR system, and SSBs may be transmitted only in the first 5 ms within the radio frame with a length of 10 ms. In other words, in each of the radio frames 711 and 712 of the measurement gap repetition period #0 710, SSBs are transmitted only in the first 5 slots, and SSBs are not transmitted in the remaining 5 slots.

In this case, as described above, it may be difficult to transmit all SSBs within the SSB transmission duration of 5 ms. In other words, as described in FIG. 5, 8 SSBs need to be transmitted, but a case where all 8 SSBs cannot be transmitted in the SSB transmission duration of 5 ms. In this case, SSBs may be transmitted using a method illustrated in FIG. 7.

FIG. 7 proposes a method of transmitting SSBs over different radio frames within the measurement gap repetition period when all 8 SSBs cannot be transmitted in the SSB transmission duration of 5 ms as described above. For example, although the base station or satellite needs to transmit 8 SSBs, if the base station or satellite can only transmit 4 SSBs within one radio frame, it may transmit the remaining 4 SSBs using another radio frame within the measurement gap repetition period.

For example, the base station or satellite may transmit 4 SSBs using the first 5 slots of the first radio frame 711 in the measurement gap repetition period #0 710, and transmit the remaining 4 SSBs using the first 5 slots of the second radio frame 712 in the measurement gap repetition period #0 710. This may be equally applied to the next measurement gap repetition period #1 720. In other words, the base station or satellite may transmit 4 SSBs using the first 5 slots of the first radio frame 721 in the measurement gap repetition period #1 720, and transmit the remaining 4 SSBs using the first 5 slots of the second radio frame 722 in the measurement gap repetition period #1 720.

In this case, start symbol indexes of the respective SSBs may use the same indexes as the start symbol indexes for the first 4 SSBs in FIG. 5. Additionally, the SSBs may be transmitted respectively through beams mapped to the SSBs.

For example, when transmitting 4 SSBs in the first radio frame 721 in the measurement gap repetition period #1 720, an SSB #0 may be transmitted at an SSB start symbol index 2 through a beam #0, an SSB #1 may be transmitted at an SSB start symbol index 8 through a beam #1, an SSB #2 may be transmitted at an SSB start symbol index 16 through a beam #2, and an SSB #3 may be transmitted at an SSB start symbol index 22 through a beam #3. Through this, the base station or satellite may transmit 4 SSBs in the first radio frame 721 within the measurement gap repetition period #1 720.

Further, when transmitting 4 SSBs in the second radio frame 722 in the measurement gap repetition period #1 720, an SSB #4 may be transmitted at an SSB start symbol index 2 through a beam #4, an SSB #5 may be transmitted at an SSB start symbol index 8 through a beam #5, an SSB #6 may be transmitted at an SSB start symbol index 16 through a beam #6, and an SSB #7 may be transmitted at an SSB start symbol index 22 through a beam #7.

In addition, as previously described in FIG. 5, the position where SSBs are transmitted according to the technical specification within the measurement gap repetition period #0 710 may be the first half frame of the first radio frame 711. In the following description, the position corresponding to the first half frame of the first radio frame 711 will be referred to as a reference position or a position where first SSBs are transmitted. In addition, second SSBs, which are the remaining SSBs, may be transmitted in the first half frame of the second radio frame 712 within the measurement gap repetition period #0 710.

Figure 8:
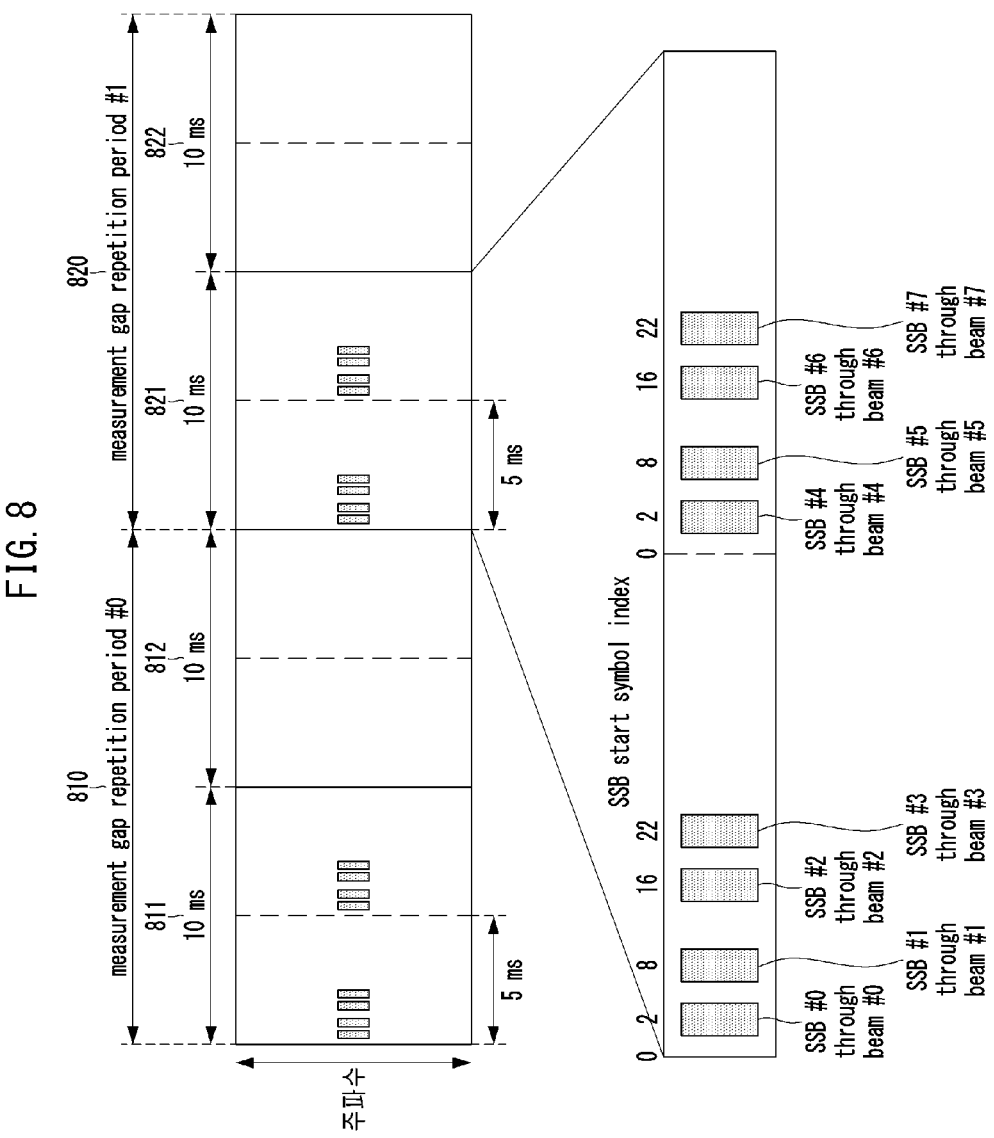
FIG. 8 is a conceptual diagram illustrating a case when SSBs corresponding to 8 beams are transmitted within one radio frame in case of 15 kHz SCS.

FIG. 8 is a conceptual diagram illustrating a case when SSBs corresponding to 8 beams are transmitted within one radio frame in case of 15 kHz SCS.

Referring to FIG. 8, a measurement gap repetition period #0 810 may consist of two radio frames 811 and 812, and a measurement gap repetition period #1 820 may also consist of two radio frames 821 and 822. Therefore, it can be seen that the measurement gap repetition period #0 810 and measurement gap repetition period #1 820 are each configured to have a length of 20 ms.

Meanwhile, it has been described in FIG. 5 that in the 5G NR system, SSBs can be transmitted only in the first 5 ms of the radio frame with a length of 10 ms. However, in FIG. 8, SSBs may be transmitted not only in the first 5 ms but also in the last 5 ms within the radio frame with a length of 10 ms. In other words, among the radio frames 811 and 812 of the measurement gap repetition period #0 810, SSBs may be transmitted only in the first radio frame 811, and SSBs may not be transmitted in the second radio frame 812.

In this case, as described above, it may be difficult to transmit all SSBs in the SSB transmission duration of 5 ms. In other words, as described in FIG. 5, although 8 SSBs need to be transmitted, a case when all 8 SSBs cannot be transmitted in the SSB transmission duration of 5 ms. In this case, SSBs may be transmitted using a method illustrated in FIG. 8.

FIG. 8 proposes a method of transmitting SSBs in one radio frame within the measurement gap repetition period when all 8 SSBs cannot be transmitted in the SSB transmission duration of 5 ms as described above. For example, although the base station or satellite needs to transmit 8 SSBs, if the base station or satellite can only transmit 4 SSBs in the first 5 slots of the one radio frame, it may transmit the remaining 4 SSBs using the remaining 5 slots of the same radio frame.

For example, the base station or satellite may transmit 4 SSBs using the first 5 slots of the first radio frame 811 in the measurement gap repetition period #0 810, and transmit the remaining 4 SSBs using the remaining 5 slots of the same radio frame in the measurement gap repetition period #0 810. The SSBs may not be transmitted in the second radio frame 812. This may be equally applied to the next measurement gap repetition period #1 820. In other words, the base station or satellite may transmit 4 SSBs using the first 5 slots of the first radio frame 821 in the measurement gap repetition period #1 820, and transmit the remaining 4 SSBs using the remaining 5 slots of the same radio frame in the measurement gap repetition period #1 820.

In this case, start symbol indexes of the respective SSBs may use the same indexes as the start symbol indexes for the first 4 SSBs in FIG. 5. Additionally, the SSBs may be transmitted respectively through beams mapped to the SSBs.

For example, when transmitting 4 SSBs using the first 5 slots of the first radio frame 821 in the measurement gap repetition period #1 820, an SSB #0 may be transmitted at an SSB start symbol index 2 through a beam #0, an SSB #1 may be transmitted at an SSB start symbol index 8 through a beam #1, an SSB #2 may be transmitted at an SSB start symbol index 16 through a beam #2, and an SSB #3 may be transmitted at an SSB start symbol index 22 through a beam #3. Through this, the base station or satellite may transmit 4 SSBs using the first 5 slots of the first radio frame 821 within the measurement gap repetition period #1 820.

Further, when transmitting 4 SSBs in the second radio frame 822 in the measurement gap repetition period #1 820, an SSB #4 may be transmitted at an SSB start symbol index 2 through a beam #4, an SSB #5 may be transmitted at an SSB start symbol index 8 through a beam #5, an SSB #6 may be transmitted at an SSB start symbol index 16 through a beam #6, and an SSB #7 may be transmitted at an SSB start symbol index 22 through a beam #7.

In addition, as previously described in FIG. 5, the position where SSBs are transmitted according to the technical specification within the measurement gap repetition period #1 820 may be the first half frame of the first radio frame 821. In the following description, the position of the first half frame of the first radio frame 821 will be referred to as a reference position or a position where first SSBs are transmitted. In addition, second SSBs, which are the remaining SSBs, may be transmitted in the second half frame of the first radio frame 821 within the measurement gap repetition period #1 820.

As described above, when transmitting SSB within one radio frame, if it is difficult to transmit the SSBs in a duration of 5 ms, one of the forms described in FIGS. 7 and 8 may be used. When transmitting SSBs as illustrated in FIG. 7 or FIG. 8, the base station or satellite may need to inform the terminal of SSB configuration information. The present disclosure proposes methods of notifying the SSB configuration information to the terminal through measurement gap configuration information (MeasGapConfig). The measurement gap configuration information may be transmitted from the base station to the terminal through RRC signaling.

According to the present disclosure, new setup information may be added to the measurement gap configuration information (MeasGapConfig) in order to transmit the SSB configuration information by including it in the measurement gap configuration information. Therefore, the setup information newly defined according to the present disclosure may indicate the SSB configuration information. In the present disclosure described below, the setup information newly added to the measurement gap configuration information (MeasGapConfig) will be referred to as 'measurement gap setup information' or 'gapSAT'. The measurement gap configuration information according to the present disclosure may be configured as shown in Table 4 below.

TABLE 4

| MeasGapConfig | |
| --- | --- |
| gapFR2 | SetupRelease{GapConfig} |
| gapFR1 | SetupRelease{GapConfig} |
| gapUE | SetupRelease{GapConfig} |
| gapSAT | SetupRelease{GapConfig} |

As exemplified in the last row of Table 4, four different measurement gap configurations (MeasGapConfig) may be possible according to the present disclosure. In other words, in addition to gapFR1, gapFR2, and gapUE described above, additional measurement gap configuration information (i.e. gapSAT) may be included.

In addition, parameters included in a gap configuration (i.e. GapConfig) of the measurement gap configuration information (gapSAT) shown in Table 4 may include indication information allowing one part or multiple specific parts within one measurement period to be measured.

In the present disclosure, a parameter included in the gap configuration (GapConfig) of the measurement gap setup information (gapSAT) may be configured as a bitmap indicating specific SSB measurement duration(s), or a parameter included in the gap configuration (GapConfig) of the measurement gap setup information (gapSAT) may indicate a spacing between SSB measurement durations. Additionally, the gap configuration (GapConfig) of the measurement gap setup information (gapSAT) may include the parameters previously described in (1) to (3). For example, the gap configuration (GapConfig) of the measurement gap setup information (gapSAT) may include the measurement gap length (MGL), measurement gap repetition periodicity (MGRP), and RF retuning time.

In other words, according to an exemplary embodiment of the present disclosure, the gap configuration (GapConfig) of the measurement gap setup information (gapSAT) may include the MGL, MGRP, RF retuning time, and the bitmap indicating specific SSB measurement duration(s).

Alternatively, according to another exemplary embodiment of the present disclosure, the gap configuration (Gap-Config) of the measurement gap setup information (gapSAT) may include the MGL, MGRP, RF retuning time, and information indicating a spacing between SSB measurement durations.

However, depending on the technical specification for SSB transmission, candidate values of the MGL may be reduced, and the RF retuning time may not be required depending on restriction of the available frequency band. In this case, the corresponding information region may be reconfigured and used as indication information of newly added measurement duration(s).

A case of adding measurement gap position (MGP) information for indicating positions of SSB measurement durations as a bitmap parameter of the gap configuration (Gap-Config) of the measurement gap setup information (gapSAT) newly defined according to the present disclosure to the measurement gap configuration information (MeasGapConfig) exemplified in Table 4 may be as shown in Table 5 below.

TABLE 5

| GapConfig | |
| --- | --- |
| Gap offset (gapOffset) | INTEGER {0 . . . 159} |
| Measurement gap length (MGL) | ENUMERATED {1.5 msec, 3 msec, 3.5 msec, 4 msec, 5.5 msec, 6 msec} |
| Measurement gap repetition periodicity (MGRP) | ENUMERATED {20 msec, 40 msec, 80 msec, 160 msec} |
| Measurement gap timing advance (MGTA) | ENUMERATED {0 msec, 0.25 msec, 0.5 msec} |
| Measurement gap position, (MGP) | BIT STRING(SIZE(4)) |
| Reference serving cell indicator (refServCellIndicator) | ENUMERATED {pCell, pSCell, mcg-FR2} |

In the present disclosure, the measurement gap position (MGP) may be 'measurement position indication informa-tion'. In other words, the MGP may be measurement position indication information that indicates measurement of SSBs, and may inform the positions where SSBs are trans-mitted. As described previously, SSBs may be transmitted in the reference position. The SSBs transmitted in the reference position may be the first SSBs as described above and may be a part of SSBs to be transmitted by the base station or satellite. Accordingly, the second SSBs, which are the remaining SSBs to be transmitted by the base station or satellite, need to be transmitted from a new position rather than the reference position, and may be transmitted in the form illustrated in FIG. 7 and/or FIG. 8 described above.

The 'measurement position indication information' according to the present disclosure will be described in more detail with reference to Table 5 above and Tables 6 and 7 below.

In the present disclosure, for convenience of description, it may be assumed that a measurement period of SSBs has a length of 20 ms, and each position where SSBs are transmitted is configured as a unit of a 5 ms half frame. This may correspond to the cases previously illustrated in FIGS. 5, 7, and 8. In this case, each half frame of 5 ms within the SSB measurement period of 20 ms may be mapped to correspond to one bit. Accordingly, when the MGP is indicated in a bitmap form, a total of 4 bits may be used. If the positions where SSBs are transmitted are indicated in a bitmap form, the reference position may be indicated as a position where SSBs are transmitted, which corresponds to a bit of the bitmap.

This will be described by taking the case of FIG. 7 described above as an example as follows. In the case of FIG. 7, since SSBs are transmitted in the first half frame of 5 ms, the first bit of the 4-bit information may be set to 1, and since SSBs are not transmitted in the second half frame of 5 ms, the second bit may be set to 0. Further, since SSBs are transmitted in the third half frame of 5 ms, the third bit may be set to 1, and since SSBs are not transmitted in the fourth half frame of 5 ms, the fourth bit may be set to 0. Accordingly, in the case of FIG. 7, the MGP expressed using a bitmap may be expressed as a value of '1010'.

This will be described again by taking the case of FIG. 8 described above as an example as follows. In the case of FIG. 8, since SSBs are transmitted in the first half frame of 5 ms, the first bit of the 4-bit information may be set to 1, and since SSBs are transmitted in the second half frame of 5 ms, the second bit may be set to 1. Further, since SSBs are not transmitted in the third half frame of 5 ms and the fourth half frame of 5 ms, both the third and fourth bits may be set to 0. Accordingly, in the case of FIG. 8, the MGP expressed using a bitmap may be expressed as a value of '1100'.

Therefore, the terminal may perform SSB measurement based on the bits of the MGP for indicating the positions of SSBs among the parameters of the gap configuration (Gap-Config) of the measurement gap setup information (gap-SAT). In other words, if a bit of the MGP is set to 1, the terminal may perform SSB measurement within a 5 ms half frame in a position corresponding to the bit, but if a bit of the MGP is set to 0, the terminal may not perform SSB measurement within a 5 ms half frame in a position corre-sponding to the bit.

In the above example, the case where the bitmap is formed in a half-frame unit has been exemplified. However, the bitmap may be configured using a unit other than the half-frame. For example, the bitmap may indicate positions of transmitted SSBs in units of a predetermined number of subframes within the measurement gap repetition period. As such, in the present disclosure, a half frame has been described as being used as a unit for the bitmap, but it should be noted that various other units may be used as a unit for the bitmap.

A case of adding MGP information for indicating posi-tions of SSB measurement durations as information on a spacing between SSB measurement durations in the param-eters of the gap configuration (GapConfig) of the measure-ment gap setup information (gapSAT) newly defined accord-ing to the present disclosure to the measurement gap configuration information (MeasGapConfig) exemplified in Table 4 may be as shown in Table 6 below.

TABLE 6

| GapConfig | |
| --- | --- |
| Gap offset (gapOffset) | INTEGER {0 . . . 159} |
| Measurement gap length (MGL) | ENUMERATED {1.5 msec, 3 msec, 3.5 msec, 5.5 msec, 6 msec} |
| Measurement gap repetition periodicity (MGRP) | ENUMERATED {20 msec, 40 msec, 80 msec, 160 msec} |
| Measurement gap timing advance (MGTA) | ENUMERATED {0 msec, 0.25 msec, 0.5 msec} |

TABLE 6-continued

| GapConfig | |
| --- | --- |
| Measurement gap position, (MGP) | ENUMERATED {1, 2, 3} |
| Reference serving cell indicator (refServCellIndicator) | ENUMERATED {pCell, pSCell, mcg-FR2} |

As described in Table 5, it may be assumed in Table 6 that the SSB measurement period has a length of 20 ms, and each position where SSBs are transmitted is configured as a unit of a 5 ms half frame. Additionally, according to the technical specification for SSB transmission, it may be assumed that the terminal can attempt measurement up to two times during one measurement period. In this case, as illustrated in FIG. 5, the positions where SSBs are transmitted may be the first radio frame of two radio frames of 20 ms. Additionally, SSB transmission in the first half frame of the first radio frame is already specified in the 3GPP technical specification.

Therefore, when the position where the first SSBs, which are SSBs transmitted in the position according to the technical specification, are transmitted is referred to as a reference position, a position where second SSBs, which are the remaining SSBs in addition to the first SSBs, are transmitted may be indicated by a spacing from the reference position. This will be described with reference to FIGS. 7 and 8.

In the case of FIG. 7, the first 5 ms half frame corresponds to the reference position, and the first SSBs may be transmitted in the reference position. Since SSBs are not transmitted in the subsequent half frame of 5 ms and the second SSBs are transmitted in the 5 ms half frame of the second radio frame, the MGP may be set to 2. In other words, it may indicate that the second SSBs are additionally transmitted in the half frame in the second position from the reference position.

Also in the case of FIG. 8, the first half frame of 5 ms corresponds to the reference position, and the first SSBs are transmitted in the reference position. Since the second SSBs are transmitted in the next half frame of 5 ms, the MGP may be set to 1. In other words, it may indicate that the second SSBs are additionally transmitted in the half frame in the first position from the reference position.

In addition, since it is assumed in FIGS. 7 and 8 that a maximum of two measurements are attempted during one measurement period, all positions where SSBs are transmitted may be indicated if only the reference position and the additional position are indicated. Since the reference position is a position that has already been specified in advance through the technical specification, it may be the position where the first SSBs are transmitted even if not specifically indicated. Accordingly, in the exemplary embodiment of Table 6, only the position where the second SSBs are transmitted may be identified from the reference position where the first SSBs are transmitted.

As described above, the RF retuning time may not be required according to a case when configuring the parameters of the gap configuration (GapConfig) of the measurement gap setup information (gapSAT) newly defined according to the present disclosure in the measurement gap configuration information (MeasGapConfig) exemplified in Table 4. Therefore, the present disclosure proposes a method of interpreting the RF retuning time as the MGP information for indicating positions of measurement durations when the RF retuning time is not required. The case of using the method of interpreting the information region corresponding to the RF retuning time as the MGP information for indicating positions of measurement durations may be exemplified as shown in Table 7 below.

TABLE 7

| GapConfig | |
| --- | --- |
| Gap offset (gapOffset) | INTEGER {0 . . . 159} |
| Measurement gap length (MGL) | ENUMERATED {1.5 msec, 3 msec, 3.5 msec, 4 msec, 5.5 msec, 6 msec} |
| Measurement gap repetition periodicity (MGRP) | ENUMERATED {20 msec, 40 msec, 80 msec, 160 msec} |
| Measurement gap timing advance (MGTA) → | ENUMERATED {0 msec, 0.25 msec, 0.5 msec} |
| Measurement gap position, (MGP) | → ENUMERATED {1, 2, 3} |
| refServCellIndicator | ENUMERATED {pCell, pSCell, mcg-FR2} |

The example shown in Table 7 may mean an example in which the MGTA value is interpreted as the MGP when the RF retuning time is not required. In this case, the information included in the MGP may be understood in the form as previously described in Table 6. Here, the case when the MGTA value is interpreted as the MGP may correspond to a case of not including information on a spacing between the second SSBs and the first SSBs transmitted in the reference position.

Meanwhile, in the above-described exemplary embodiment, the forms of configuring the gap configuration (GapConfig) by adding the measurement gap setup information (gapSAT) as exemplified in Table 4 have been described with reference to Tables 5 to 7. The above-described exemplary embodiments are based on the case of using a half frame as a unit for dividing the measurement period. However, the unit for dividing the measurement period may be configured as a radio frame of 10 ms or a specific number of subframes depending on a case. Depending on the configuration of the unit dividing the measurement period, candidate values and the size of the MGP, which is measurement duration indication information included in the gap configuration (GapConfig) of the measurement gap setup information (gapSAT), may be defined differently. Here, the unit for dividing the measurement period may be determined by the technical specification for SSB transmission.

Alternatively, the unit dividing the measurement period may be configured differently depending on the MGL value. In the present disclosure, a half frame has been described as an example, but a specific number of subframes, for example, subframes corresponding to 3 ms or 4 ms, may be configured as the unit dividing the measurement period.

According to the present disclosure described above, the terminal may perform multiple measurements during one measurement period. However, once the measurement of SSBs succeeds within one measurement period, the terminal may not perform the measurement operation even though the measurement period remains from that point to an end time of the measurement period. In addition, the terminal may report measurement value(s) to the base station after successfully measuring SSBs. Through this, the terminal may inform the base station that the terminal will not perform the measurement operation after reporting the measurement value(s).

Second Exemplary Embodiment: Method for Transmitting NACK Information after Measuring SSB Signals If the terminal according to the present disclosure fails to measure SSBs in the SSB measurement duration within the SSB measurement period, the terminal may report the failure of SSB measurement to the base station. In this case, the terminal may transmit NACK information indicating the failure of SSB measurement to the base station. In the present disclosure, the NACK information may be delivered in the following schemes.

As described above, it has been described that 7 bits are used as both the first layer (i.e. layer 1) report information and third layer (i.e. layer 3) report information for SS-RSRP. The SS-RSRP report information with a length of 7 bits may indicate a report value from 0 to 127.

In an exemplary embodiment of the present disclosure, a value 0 or 127 for the SS-RSRP report information may be configured to be reinterpreted as information indicating a negative response (NACK). In this case, mapping between measurement values and reported values may be adjusted. In other words, when the value 0 indicates NACK information, the mapping of values 1 to 127 may be adjusted in advance, such that the terminal and base station interpret the SS-RSRP report information according to the remapped values not indicating NACK. As another example, when the value 127 indicates NACK information, the mapping of values 0 to 126 may be adjusted in advance, such that the terminal and the base station interpret the SS-RSRP report information according to the remapped values not indicating NACK.

In the above, the case where only a negative response (NACK) is reported has been described as an example. Similarly, a case where specific SS-RSRP report information is transmitted may be interpreted as transmission of an affirmative response (ACK).

In another exemplary embodiment of the present disclosure, the base station may transmit a response (e.g. ACK/NACK) request for SSB measurement to the terminal through a physical downlink control channel (PDCCH). In this case, the base station may allocate an uplink resource by the response request. Accordingly, when the terminal receives the response request, the terminal transmit response (i.e. ACK/NACK) information for SSB measurement to the base station by using the uplink resource allocated by the response request.

When the base station receives NACK information for SSB measurement from the terminal based on one of the two exemplary embodiments above, the base station may transmit a gap configuration (GapConfig) configured with new parameter(s) to the terminal through RRC signaling. Through this, the terminal may resume SSB reception and measurement based on the new gap configuration.

Meanwhile, as is already widely known, when the terminal receives SSB(s) and measures reception power(s) thereof, the terminal may report a reception power value of an SSB having the highest received strength to the base station or may report a predetermined number of SSB reception power value(s), which are sorted in descending order from the highest received strength, to the base station. In this case, the terminal may report beam index(es) with the received SSB power value(s) to the base station.

The first and second exemplary embodiments described above may be used in combination. Hereinafter, a case where the first and second exemplary embodiments are used in combination will be described from the terminal's perspective.

Figure 9:
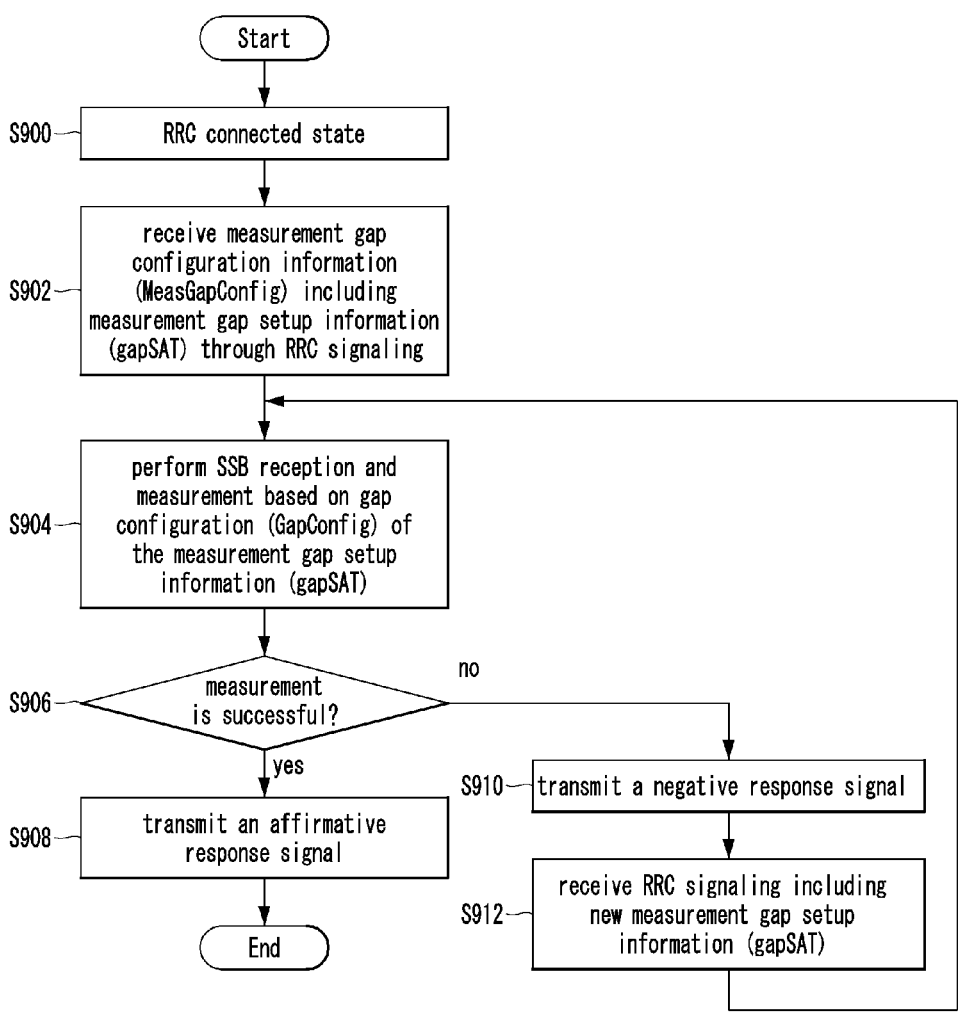
FIG. 9 is a flowchart illustrating an exemplary embodiment for a case in which a terminal performs SSB measurement and reports a response therefor according to the present disclosure.

FIG. 9 is a flowchart illustrating an exemplary embodiment for a case in which a terminal performs SSB measurement and reports a response therefor according to the present disclosure.

Referring to FIG. 9, in step S900, the terminal may be in the RRC connected state with the base station. Here, the base station may be a terrestrial base station as described in FIG. 5, or the base station may be a satellite base station as described in FIG. 6. In an exemplary embodiment of the present disclosure described in FIG. 9, the case when the terminal is in the RRC connected state will be described as an example. However, it should be noted that the exemplary embodiment is applicable also when the terminal according to the present disclosure receives RRC signaling in the RRC idle state or RRC inactive state.

In step S902, the terminal may receive the measurement gap configuration information (MeasGapConfig) including the measurement gap setup information (gapSAT) through RRC signaling from the base station. In this case, the measurement gap configuration information may be configured with the information element(s) exemplified in Table 4 described in the first exemplary embodiment.

In step S904, the terminal may identify position(s) where the terminal receives SSBs based on the gap configuration (GapConfig) of the measurement gap setup information (gapSAT). The gap configuration (GapConfig) may have a form of any one of Tables 5 to 7 described above. Accordingly, the terminal may identify the position(s) where SSBs are transmitted using the measurement gap position (MGP) included in the gap configuration corresponding to any one of Tables 5 to 7 above. Then, the terminal may attempt to receive SSBs in the identified position(s) where SSBs are transmitted. In this case, the reception of SSBs may be performed by configuring actual measurement window(s) within the measurement gap length, and receiving SSBs in SMTC window(s) configured within the configured measurement window, as previously described in FIGS. 4A and 4B. In step S904, the terminal may measure the SSBs within the window.

In step S906, the terminal may check whether the SSB measurement is successful. In this case, a success or failure of the SSB measurement may be determined by checking whether a signal within a specific reporting range of SS-RSRP is received, as described above. If a signal within the reporting range is received, the terminal may determine that SSB reception and measurement have succeeded, and if a signal within the reporting range is not received, the terminal may determine that SSB reception and measurement have failed.

If the SSB measurement has succeeded, the terminal may transmit an affirmative response in step S908. The affirmative response may be understood as corresponding to a case in which information expressing a specific SS-RSRP value is received as the SS-RSRP report information.

In addition, the terminal may inform the base station that the terminal will not perform the SSB measurement operation thereafter by reporting the affirmative response (i.e. ACK) signal indicating that the SSB measurement has succeeded to the base station.

On the other hand, if the SSB measurement has failed, the terminal may proceed to step S910. If the SSB measurement has failed, the terminal may transmit a negative response (i.e. NACK) signal to the base station in step S910. In this case, as described in the second exemplary embodiment, one of the SS-RSRP report values may be mapped to the negative response, and the negative response may be transmitted at the time of the SS-RSRP reporting.

The terminal transmitting the negative response may proceed to step S912 and receive RRC signaling including new measurement gap setup information from the base station. Upon receiving the RRC signaling including the new measurement gap setup information, the terminal may restart from step S904.

Figure 10:
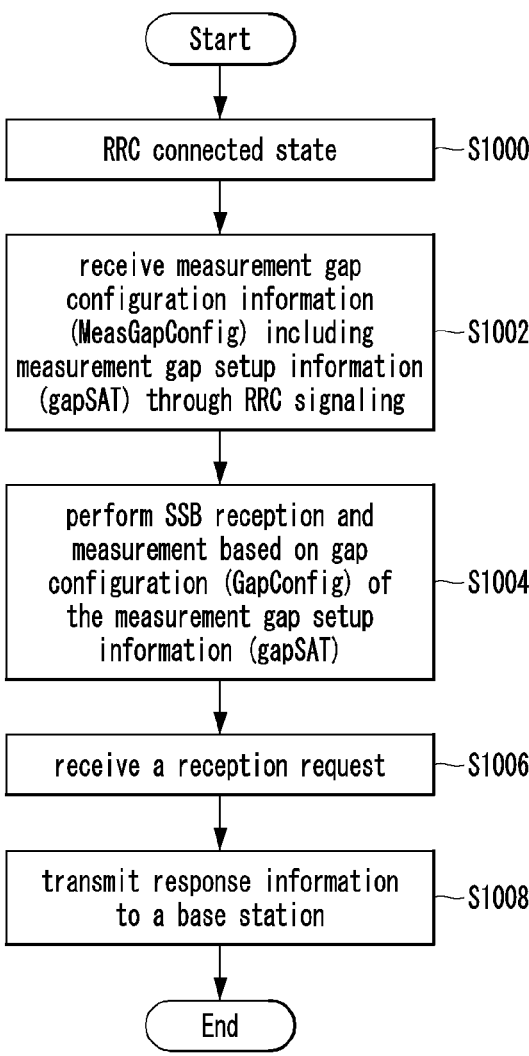
FIG. 10 is a flowchart illustrating another exemplary embodiment for a case in which a terminal performs SSB measurement and reports a response therefor according to the present disclosure.

FIG. 10 is a flowchart illustrating another exemplary embodiment for a case in which a terminal performs SSB measurement and reports a response therefor according to the present disclosure.

Referring to FIG. 10, in step S1000, the terminal may be in the RRC connected state with the base station. In an exemplary embodiment of the present disclosure described in FIG. 10, the case when the terminal is in the RRC connected state will be described as an example.

However, it should be noted that the exemplary embodiment is applicable also when the terminal according to the present disclosure receives RRC signaling in the RRC idle state or RRC inactive state.

In step S1002, the terminal may receive the measurement gap configuration information (MeasGapConfig) including the measurement gap setup information (gapSAT) through RRC signaling from the base station. In this case, the measurement gap configuration information may be configured with the information element(s) exemplified in Table 4 described in the first exemplary embodiment.

In step S1004, the terminal may identify position(s) where the terminal receives SSBs based on the gap configuration (GapConfig) of the measurement gap setup information (gapSAT). The gap configuration (GapConfig) may have a form of any one of Tables 5 to 7 described above. Accordingly, the terminal may identify the position(s) where SSBs are transmitted using the measurement gap position (MGP) included in the gap configuration corresponding to any one of Tables 5 to 7 above. Then, the terminal may attempt to receive SSBs in the identified position(s) where SSBs are transmitted. In this case, the reception of SSBs may be performed by configuring actual measurement window(s) within the measurement gap length, and receiving SSBs in SMTC window(s) configured within the configured measurement window, as previously described in FIGS. 4A and 4B. In step S1004, the terminal may measure the SSBs within the window.

In step S1006, the terminal may receive a response request from the base station. The response request may be received through a PDCCH and may indicate a request for a response (e.g. ACK/NACK) for SSB measurement. Additionally, the response request may include information on an uplink resource for transmitting the response.

In step S1008, the terminal may transmit a result of the SSB reception and measurement in step S1004, that is, SSB reception affirmative response (i.e. ACK) information or SSB reception negative reception (i.e. NACK) information, to the base station by using the uplink resource allocated by the response request.

If a negative response is received from the terminal, the base station may transmit new measurement gap setup information to the terminal through RRC signaling. As a result, this may mean that from the terminal's perspective, the process is performed again starting from step S1002 in which RRC signaling is received.

FIGS. 9 and 10 illustrate an example of a combination of methods according to the present disclosure. However, combinations not described using FIGS. 9 and 10, that is, various combinations described throughout FIGS. 1 to 8 and the first and second exemplary embodiments, may be additionally performed. Additionally, the methods described above may be applied to various systems that support beam switching, handover to an adjacent cell, connection to another network, or connection to another frequency band.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a terminal, comprising:

receiving, from a base station, radio resource control (RRC) signaling including measurement gap configuration information (MeasGapConfig) including gap setup information (gapSAT) of synchronization signal blocks (SSBs);

obtaining transmission position information of first SSBs and second SSBs transmitted in different positions based on gap configuration (GapConfig) of the gap setup information;

receiving the first SSBs and the second SSBs through different beams from the base station based on the obtained transmission position information; and measuring reception powers of the received first SSBs and second SSBs.

2. The method according to claim 1, wherein the transmission position information of the first SSBs and the second SSBs is indicated as a bitmap, and each of bits constituting the bitmap sequentially corresponds to a unit of a half frame or a predetermined number of subframes within an SSB measurement gap repetition periodicity (MGRP).

3. The method according to claim 2, wherein the gap configuration includes at least one of a gap offset (gapOffset), a measurement gap length (MGL), a measurement gap repetition periodicity (MGRP), a measurement gap timing advance (MGTA), or a reference serving cell indicator (refServCellIndicator).

4. The method according to claim 1, wherein the first SSBs are transmitted in a reference position, a position where the second SSBs are transmitted is indicated by a first parameter included in the gap configuration as a number of intervals between the first SSBs and the second SSBs, and a unit of the interval is a half frame or a predetermined number of subframes.

5. The method according to claim 1, wherein the gap configuration includes at least one of a gap offset (gapOffset), a measurement gap length (MGL), a measurement gap repetition periodicity (MGRP), a measurement gap timing advance (MGTA), or a reference serving cell indicator (refServCellIndicator); the MGTA is interpreted as a number of intervals between a reference position where the first SSBs are transmitted and a position where the second SSBs are transmitted within the MGRP, when the gap configuration does not include information on a spacing between the first SSBs and the second SSBs; and a unit of the interval is a half frame or a predetermined number of subframes.

6. The method according to claim 1, further comprising:
upon successful measurement of the first SSBs or the second SSBs, transmitting measurement value(s) of successfully measured SSB(s) to the base station; and
stopping measurement of the first SSBs or the second SSBs after transmitting the measurement value(s) of successfully measured SSB(s) to the base station.

7. The method according to claim 6, wherein each of the measurement value(s) of successfully measured SSB(s) is a channel state information (CSI) value measured in a layer 1 or a synchronization signal-reference signal reception power (SS-RSRP) value measured at a layer 3.

8. The method according to claim 1, further comprising:
in response to a measurement failure of the first SSBs and the second SSBs, reporting, to the base station, a value preset to indicate a negative response among synchronization signal-reference signal received power (SS-RSRP) values.

9. The method according to claim 1, further comprising:
receiving, from the base station, a physical downlink control channel (PDCCH) including an indication of request for a measurement response and information on an uplink resource for transmitting the measurement response for the first SSBs or the second SSBs; and
transmitting, to the base station, a reception acknowledgment (ACK) for the first SSBs or the second SSBs or a reception negative ACK (NACK) for the first SSBs or the second SSBs through the uplink resource.

10. A terminal comprising a processor,
wherein the processor causes the terminal to perform:
receiving, from a base station, radio resource control (RRC) signaling including measurement gap configuration information (MeasGapConfig) including gap setup information (gapSAT) of synchronization signal blocks (SSBs);
obtaining transmission position information of first SSBs and second SSBs transmitted from different positions based on gap configuration (GapConfig) of the gap setup information;
receiving the first SSBs and the second SSBs through different beams from the base station based on the obtained transmission position information; and measuring reception powers of the received first SSBs and second SSBs.

11. The terminal according to claim 10, wherein the transmission position information of the first SSBs and the second SSBs is indicated as a bitmap, and each of bits constituting the bitmap sequentially corresponds to a unit of a half frame or a predetermined number of subframes within an SSB measurement gap repetition periodicity (MGRP).

12. The terminal according to claim 10, wherein the first SSBs are transmitted in a reference position, a position where the second SSBs are transmitted is indicated by a first parameter included in the gap configuration as a number of intervals between the first SSBs and the second SSBs, and a unit of the interval is a half frame or a predetermined number of subframes.

13. The terminal according to claim 10, wherein the gap configuration includes at least one of a gap offset (gapOffset), a measurement gap length (MGL), a measurement gap repetition periodicity (MGRP), a measurement gap timing advance (MGTA), or a reference serving cell indicator (refServCellIndicator); the MGTA is interpreted as a number of intervals between a reference position where the first SSBs are transmitted and a position where the second SSBs are transmitted within the MGRP, when the gap configuration does not include information on a spacing between the first SSBs and the second SSBs; and a unit of the interval is a half frame or a predetermined number of subframes.

14. The terminal according to claim 10, wherein the processor further causes the terminal to perform:
upon successful measurement of the first SSBs or the second SSBs, transmitting measurement value(s) of successfully measured SSB(s) to the base station; and
stopping measurement of the first SSBs or the second SSBs after transmitting the measurement value(s) of successfully measured SSB(s) to the base station,
wherein each of the measurement value(s) of successfully measured SSB(s) is a channel state information (CSI) value measured in a layer 1 or a synchronization signal-reference signal reception power (SS-RSRP) value measured at a layer 3.

15. The terminal according to claim 10, wherein the processor further causes the terminal to perform: in response to a measurement failure of the first SSBs and the second SSBs, reporting, to the base station, a value preset to indicate a negative response among synchronization signal-reference signal received power (SS-RSRP) values.

16. The terminal according to claim 10, wherein the processor further causes the terminal to perform:
receiving, from the base station, a physical downlink control channel (PDCCH) including an indication of request for a measurement response and information on an uplink resource for transmitting the measurement response for the first SSBs or the second SSBs; and
transmitting, to the base station, a reception acknowledgment (ACK) for the first SSBs or the second SSBs or a reception negative ACK (NACK) for the first SSBs or the second SSBs through the uplink resource.

17. A method of a base station, comprising:
transmitting, to a terminal, radio resource control (RRC) signaling including measurement gap configuration information (MeasGapConfig) including gap setup information (gapSAT) of synchronization signal blocks (SSBs);
transmitting first SSBs and second SSBs through beams respectively corresponding to a plurality of spatially separated regions, based on the measurement gap configuration information; and receiving a reception power for at least one SSB among the first SSBs or the second SSBs from the terminal, wherein a gap configuration (GapConfig) included in the gap setup information includes transmission position information of the first SSBs and the second SSBs transmitted in different positions within an SSB measurement gap repetition periodicity (MGRP).

18. The method according to claim 17, wherein the transmission position information of the first SSBs and the second SSBs is indicated as a bitmap, and each of bits constituting the bitmap sequentially corresponds to a unit of a half frame or a predetermined number of subframes within the SSB MGRP.

19. The method according to claim 17, wherein the first SSBs are transmitted in a reference position, a position where the second SSBs are transmitted is indicated by a first parameter included in the gap configuration as a number of intervals from the first SSBs, and a unit of the interval is a half frame or a predetermined number of subframes.

20. The method according to claim 17, wherein the gap configuration includes at least one of a gap offset (gapOffset), a measurement gap length (MGL), a measurement gap repetition periodicity (MGRP), a measurement gap timing advance (MGTA), or a reference serving cell indicator (refServCellIndicator); the MGTA is interpreted as a number of intervals between a reference position where the first SSBs are transmitted and a position where the second SSBs are transmitted within the MGRP, when the gap configuration does not include information on a spacing between the first SSBs and the second SSBs; and a unit of the interval is a half frame or a predetermined number of subframes.

\* \* \* \* \*